(12) United States Patent
Tan

(10) Patent No.: US 11,803,038 B2
(45) Date of Patent: Oct. 31, 2023

(54) CAMERA OPTICAL LENS

(71) Applicant: AAC Optics (Changzhou) Co., Ltd., Changzhou (CN)

(72) Inventor: Mengke Tan, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 392 days.

(21) Appl. No.: 17/134,501

(22) Filed: Dec. 28, 2020

(65) Prior Publication Data

US 2022/0066165 A1     Mar. 3, 2022

(30) Foreign Application Priority Data

Aug. 25, 2020   (CN) .......................... 202010860096.4

(51) Int. Cl.
 *G02B 13/00* (2006.01)
 *G02B 9/62* (2006.01)
 *G02B 27/00* (2006.01)

(52) U.S. Cl.
 CPC ........... *G02B 13/0045* (2013.01); *G02B 9/62* (2013.01); *G02B 27/0025* (2013.01)

(58) Field of Classification Search
 CPC .... G02B 13/02; G02B 13/0045; G02B 13/06; G02B 3/02; G02B 3/04; G02B 27/0012; G02B 27/0025

USPC ................ 359/714, 658, 713, 752, 756, 757
See application file for complete search history.

(56) References Cited

U.S. PATENT DOCUMENTS

| | | | |
|---|---|---|---|
| 2014/0063618 A1* | 3/2014 | Park ...................... | G02B 13/18 359/713 |
| 2017/0010444 A1* | 1/2017 | Teraoka .................. | G02B 9/62 |
| 2018/0188506 A1* | 7/2018 | Chang ..................... | G02B 9/62 |
| 2022/0206254 A1* | 6/2022 | Wang ................. | G02B 13/0045 |

* cited by examiner

*Primary Examiner* — Travis S Fissel
(74) *Attorney, Agent, or Firm* — W&G Law Group

(57) ABSTRACT

A camera optical lens includes from an object side to an image side: a first lens, a second lens, a third lens, a fourth lens, a fifth lens and a sixth lens. The camera optical lens satisfies: $-1.00 \leq f2/f \leq -0.60$; $1.50 \leq R6/R5$ and $2.00 \leq d4/d5 \leq 10.00$, where f denotes a focal length of the camera optical lens, f2 denotes a focal length of the second lens, R5 denotes a central curvature radius of an object side surface of the third lens, R6 denotes a central curvature radius of an image side surface of the third lens, d4 denotes an on-axis distance from an image side surface of the second lens to an object side surface of the third lens, and d5 denotes an on-axis thickness of the third lens. The camera optical lens of the application has good optical performance and meets the design requirement for a long focal length.

9 Claims, 11 Drawing Sheets

CAMERA OPTICAL LENS

TECHNICAL FIELD

The present application relates to the field of optical lenses, and more particularly, to a camera optical lens suitable for portable terminal equipment such as smart phones and digital cameras, and imaging devices such as monitors and PC lenses.

BACKGROUND

In recent years, with the emergence of smart phones, the demand for miniaturized photographic lenses is increasing day by day. Generally, either a Charge Coupled Device (CCD) or a Complementary Metal-oxide Semiconductor Sensor (CMOS Sensor) is used as the photosensitive device of a general photographic lens. Due to the improvement of semiconductor manufacturing technology, the pixel size of the photosensitive devices is reduced. In addition, the development trend of today's electronic products is having good functions with a thin and short appearance. Therefore, miniaturized imaging lenses with a good imaging quality have become the mainstream in the current market.

In order to obtain a better imaging quality, traditional lenses mounted on mobile phone cameras mostly adopt a three-piece or four-piece lens structure. In addition, with the development of technology and the increase of diversified needs of users, and as the pixel area of photosensitive devices is becoming smaller and smaller and the requirement of the system on imaging quality is improving constantly, five-piece, six-piece and seven-piece lens structure gradually appear in lens designs. Although the common six-piece lenses have a good optical performance, their settings on refractive power, lens spacing and lens shape still have some irrationality, which results in that the lens structure cannot achieve a high optical performance while satisfying the design requirement for a long focal length.

SUMMARY

In view of the above problems, the present disclosure aims to provide a camera optical lens, which has a high optical performance while satisfying the design requirement for a long focal length.

To solve the above technical problems, a camera optical lens is provided according to an embodiment of the present application, including from an object side to an image side: a first lens having positive refractive power, a second lens having negative refractive power, a third lens having negative refractive power, a fourth lens, a fifth lens having positive refractive power and a sixth lens having negative refractive power, wherein the camera optical lens satisfies:

$-1.00 \leq f2/f \leq -0.60$;

$1.50 \leq R6/R5$; and $2.00 \leq d4/d5 \leq 10.00$ where f denotes a focal length of the camera optical lens,
f2 denotes a focal length of the second lens,
R5 denotes a central curvature radius of an object side surface of the third lens,
R6 denotes a central curvature radius of an image side surface of the third lens,
d4 denotes an on-axis distance from an image side surface of the second lens to the object side surface of the third lens, and
d5 denotes an on-axis thickness of the third lens. As an improvement, the camera optical lens satisfies: $f3/f \leq -2.00$, where f3 denotes a focal length of the third lens.

As an improvement, the camera optical lens satisfies: $2.50 \leq (R9+R10)/(R9-R10) \leq 20.00$, where R9 denotes a central curvature radius of an object side surface of the fifth lens, and R10 denotes a central curvature radius of an image side surface of the fifth lens.

As an improvement, the camera optical lens satisfies:

$0.20 \leq f1/f \leq 0.78$;

$-1.46 \leq (R1+R2)/(R1-R2) \leq -0.40$; and $0.10 \leq d1/TTL \leq 0.33$, where f1 denotes a focal length of the first lens,
R1 denotes a central curvature radius of an object side surface of the first lens,
R2 denotes a central curvature radius of an image side surface of the first lens,
d1 denotes an on-axis thickness of the first lens, and
TTL denotes a total optical length from the object side surface of the first lens to an image plane of the camera optical lens along an optic axis.

As an improvement, the camera optical lens satisfies:

$0.62 \leq (R3+R4)/(R3-R4) \leq 2.24$; and $0.02 \leq d3/TTL \leq 0.06$, where R3 denotes a central curvature radius of an object side surface of the second lens,
R4 denotes a central curvature radius of the image side surface of the second lens,
d3 denotes an on-axis thickness of the second lens, and
TTL denotes a total optical length from an object side surface of the first lens to an image plane of the camera optical lens along an optic axis.

As an improvement, the camera optical lens satisfies:

$-9.69 \leq (R5+R6)/(R5-R6) \leq -0.67$; and $0.01 \leq d5/TTL \leq 0.12$, where TTL denotes a total optical length from an object side surface of the first lens to an image plane of the camera optical lens along an optic axis.

As an improvement, the camera optical lens satisfies:

$-4.83 \leq f4/f \leq 29.90$;

$1.20 \leq (R7+R8)/(R7-R8) \leq 276.09$; and $0.01 \leq d7/TTL \leq 0.07$, where f4 denotes a focal length of the fourth lens,
R7 denotes a central curvature radius of an object side surface of the fourth lens,
R8 denotes a central curvature radius of an image side surface of the fourth lens, and
TTL denotes a total optical length from an object side surface of the first lens to an image plane of the camera optical lens along an optic axis.

As an improvement, the camera optical lens satisfies:

$0.24 \leq f5/f \leq 1.99$; and $0.04 \leq d9/TTL \leq 0.23$, where f5 denotes a focal length of the fifth lens,
d9 denotes an on-axis thickness of the fifth lens, and TTL denotes a total optical length from an object side surface of the first lens to an image plane of the camera optical lens along an optic axis.

As an improvement, the camera optical lens satisfies:

$-3.51 \leq f6/f \leq -0.34;$ $-2.94 \leq (R11+R12)/(R11-R12) \leq -0.60;$ and $0.02 \leq d11/TTL \leq 0.16,$ where f6 denotes a focal length of the sixth lens,
R11 denotes a central curvature radius of an object side surface of the sixth lens,
R12 denotes a central curvature radius of an image side surface of the sixth lens,
d11 denotes an on-axis thickness of the sixth lens, and
TTL denotes a total optical length from an object side surface of the first lens to an image plane of the camera optical lens along an optic axis.

As an improvement, the camera optical lens satisfies: f/TTL≥1.00, where TTL denotes a total optical length from an object side surface of the first lens to an image plane of the camera optical lens along an optic axis.

The present application has following beneficial effects: the camera optical lens according to the present application has excellent optical characteristics and a long focal length, and thus is especially suitable for mobile phone camera lens assemblies and WEB camera lenses composed of high-pixel CCD, CMOS and other camera elements.

BRIEF DESCRIPTION OF DRAWINGS

In order to explain the technical solution in the embodiments of the present application more clearly, the drawings used in the description of the embodiments will be briefly introduced below. Obviously, the drawings in the following description are only some embodiments of the present application, and other drawings can be obtained according to these drawings for a person skilled in the art without paying creative work. In the drawing.

DESCRIPTION OF EMBODIMENTS

In order to make the object, technical solution and advantages of the present application clearer, each embodiment of the present application will be described in detail with reference to the accompanying drawings. However, it could be understood by those having ordinary skill in the art that in various embodiments of the present application, many technical details are put forward in order to make readers better understand the present application. However, the technical solution claimed by the present application can be realized even without these technical details or various changes or modifications based on the following embodiments.

First Embodiment

Figure 1:
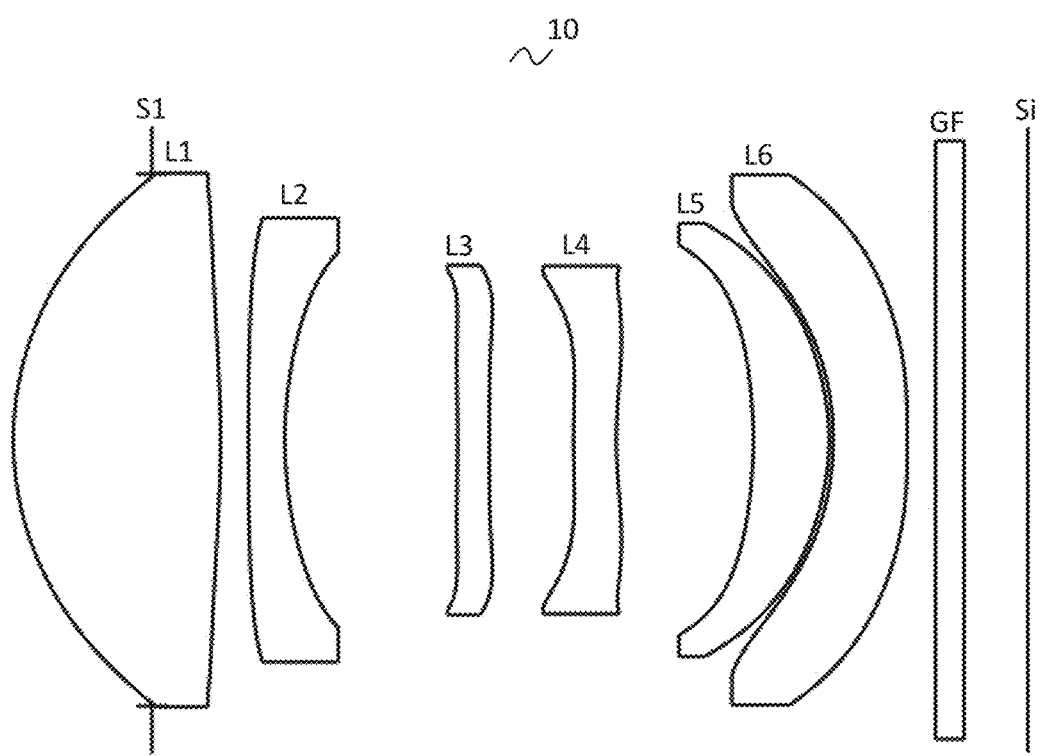
FIG. 1 is a schematic structural diagram of a camera optical lens according to a first embodiment of the present application.

Referring to the drawings, a camera optical lens 10 is provided according to the present application. FIG. 1 shows a camera optical lens 10 according to a first embodiment of the present application. The camera optical lens 10 includes six lenses. Specifically, the camera optical lens 10 includes an aperture S1, a first lens L1, a second lens L2, a third lens L3, a fourth lens L4, a fifth lens L5 and a sixth lens L6, which are arranged in sequence from an object side surface to an image side surface. Optical elements such as an optical filter (GF) may be disposed between the sixth lens L6 and an image surface Si.

In this embodiment, the first lens L1 has positive refractive power, the second lens L2 has negative refractive power, the third lens L3 has negative refractive power, the fourth lens L4 has negative refractive power, the fifth lens L5 has positive refractive power, and the sixth lens L6 has negative refractive power.

In this embodiment, the first lens L1 is made of plastic, the second lens L2 is made of plastic, the third lens L3 is made of plastic, the fourth lens L4 is made of plastic, the fifth lens L5 is made of plastic and the sixth lens L6 is made of plastic. In other embodiments, each lens can be made of other materials.

In this embodiment, a focal length of the camera optical lens 10 is defined as f, and a focal length of the second lens L2 is defined as f2, which satisfy a following relation: $-1.00 \leq f2/f \leq -0.60$. Thus, a ratio of the focal length of the second lens to the total focal length of the system is specified, which can effectively balance the spherical aberration and field curvature of the system.

A central curvature radius of an object side surface of the third lens L3 is defined as R5, and a central curvature radius of an image side surface of the third lens L3 is defined as R6, which satisfy a following relation: 1.50≤R6/R5. In this way, the shape of the third lens is specified. Within the prescribed range of the conditional expression, a deflection degree of light passing through the lens can be alleviated and the aberration can be effectively reduced.

An on-axis distance from an image side surface of the second lens L2 to an object side surface of the third lens L3 is defined as d4, and an on-axis thickness of the third lens is defined as d5, which satisfy a following relation: 2.00≤d4/d5≤10.00. Thus, a ratio of an air space between the second and third lenses to the thickness of the third lens is specified, which helps to reduce the total optical length of the optical system and realize the ultra-thin effect within the range of conditional expression.

The focal length of the camera optical lens 10 is defined as f, and a focal length of the third lens L3 is defined as f3, which satisfy a following relation: f3/f≤−2.00. Thus, a ratio of the focal length of the third lens to the total focal length of the system is specified, resulting in a system with a better imaging quality and a lower sensitivity through reasonable distribution of optical power.

A central curvature radius of an object side surface of the fifth lens L5 is defined as R9, and a central curvature radius of an image side surface of the fifth lens L5 is defined as R10, which satisfy a following relation: 2.50≤(R9+R10)/(R9−R10)≤20.00. Thus, a shape of the fifth lens is specified. In this range, with the development of ultra-thinning, it is beneficial to correcting the aberration of off-axis angle of view.

In this embodiment, an object side surface of the first lens L1 is convex at a paraxial position, and an image side surface thereof is convex at a paraxial position.

The focal length of the camera optical lens 10 is defined as f, and a focal length of the first lens L1 is defined as f1, which satisfy a following relation: 0.20≤f1/f≤0.78. Thus, a ratio of the focal length of the first lens L1 to the focal length of the camera optical lens is specified. Within the specified range, the first lens has appropriate positive refractive power. It is beneficial to reducing system aberration. In an embodiment, 0.32≤f1/f≤0.63 is satisfied.

A central curvature radius of the object side surface of the first lens L1 is R1, and a central curvature radius of the image side surface of the first lens L1 is R2, which satisfy a following relation: −1.46≤(R1+R2)/(R1−R2)≤−0.40. The shape of the first lens L1 is reasonably controlled so that the first lens L1 can effectively correct a spherical aberration of the system. In an embodiment, −0.91≤(R1+R2)/(R1-R2)≤−0.50 is satisfied.

An on-axis thickness of the first lens L1 is d1, and a total optical length from an object side surface of the first lens to an image plane of the camera optical lens 10 along an optic axis is TTL, which satisfy a following relation: 0.10≤d1/TTL≤0.33. It is beneficial to realizing ultra-thinning within the range of the conditional expression. In an embodiment, 0.16≤d1/TTL≤0.26 is satisfied.

In this embodiment, the object side surface of the second lens L2 is convex at the paraxial position, and the image side surface thereof is concave at the paraxial position.

A central curvature radius of the object side surface of the second lens L2 is defined as R3, and a central curvature radius of the image side surface of the second lens L2 is defined as R4, which satisfy a following relation: 0.62≤(R3+R4)/(R3−R4)≤2.24. In this way, the shape of the second lens L2 is specified. Within this range, it is beneficial to correcting the problem of on-axis chromatic aberration with the development of ultra-thinning of the lens. In an embodiment, 1.00≤(R3+R4)/(R3−R4)≤1.79 is satisfied.

An on-axis thickness of the second lens L2 is d3, and the total optical length of the camera optical lens 10 is TTL, which satisfy the following relation: 0.02≤d3/TTL≤0.06. It is beneficial to realizing ultra-thinning within the range of the conditional expression. In an embodiment, 0.03≤d3/TTL≤0.05 is satisfied.

In this embodiment, the object side surface of the third lens L3 is concave at the paraxial position, and the image side surface thereof is convex at the paraxial position.

A central curvature radius of the object side surface of the third lens L3 is defined as R5, and a central curvature radius of the image side surface of the third lens L3 is defined as R6, which satisfy a following relation: −9.69≤(R5+R6)/(R5−R6)≤−0.67. In this way, the shape of the third lens is specified. Within the range specified by the conditional expression, the deflection degree of the light passing through the lens can be alleviated and the aberration can be effectively reduced. In an embodiment, −6.06≤(R5+R6)/(R5−R6)≤−0.83 is satisfied.

The on-axis thickness of the third lens L3 is d5, and the total optical length of the camera optical lens 10 is TTL, which satisfy a following relation: 0.01≤d5/TTL≤0.12. It is beneficial to realizing ultra-thinning within the range of the conditional expression. In an embodiment, 0.02≤d5/TTL≤0.09 is satisfied.

In this embodiment, the object side surface of the fourth lens L4 is convex at the paraxial position, and the image side surface thereof is concave at the paraxial position.

A focal length of the fourth lens L4 is defined as f4, and the focal length of the camera optical lens 10 is defined as f, which satisfy a following relation: −4.83≤f4/f≤29.90. Thus, a ratio of the focal length of the fourth lens to the focal length of the system is specified. It is helpful to improve the performance of the optical system within the range of the conditional expression. In an embodiment, −3.02≤f4/f≤23.92 is satisfied.

A central curvature radius of the object side surface of the fourth lens L4 is R7, and a central curvature radius of the image side surface of the fourth lens L4 is R8, which satisfy a following relation: 1.20≤(R7+R8)/(R7−R8)≤276.09. In this way, the shape of the fourth lens L4 is specified. Within this range, it is beneficial to correcting the aberration of off-axis angle of view. In an embodiment, 1.92≤(R7+R8)/(R7−R8)≤220.87 is satisfied.

An on-axis thickness of the fourth lens L4 is d7, and the total optical length of the camera optical lens 10 is TTL, which satisfy a following relation: 0.01≤d7/TTL≤0.07. It is beneficial to realizing ultra-thin within the range of the conditional expression. In an embodiment, 0.02≤d7/TTL≤0.06 is satisfied.

In this embodiment, the object side surface of the fifth lens L5 is concave at the paraxial position, and the image side surface thereof is convex at the paraxial position.

The focal length of the camera optical lens 10 is defined as f, and a focal length of the fifth lens L5 is defined as f5, which satisfy a following relation: 0.24≤f5/f≤1.99. The definition of the fifth lens L5 can effectively smooth a light angle of the imaging lens and reduce the tolerance sensitivity. In an embodiment, 0.38≤f5/f≤1.59 is satisfied.

An on-axis thickness of the fifth lens L5 is d9, and the total optical length of the camera optical lens 10 is TTL, which satisfy the following relation: 0.04≤d9/TTL≤0.23. It is beneficial to realizing ultra-thinning within the range of the conditional expression. In an embodiment, $0.06 \leq d9/TTL \leq 0.18$ is satisfied.

In this embodiment, the object side surface of the sixth lens L6 is concave at the paraxial position, and the image side surface thereof is convex at the paraxial position.

The focal length of the camera optical lens 10 is defined as f, and a focal length of the sixth lens L6 is defined as f6, which satisfy a following relation: $-3.51 \leq f6/f \leq -0.34$. The system can have a better imaging quality and a lower sensitivity through reasonable distribution of focal power. In an embodiment, $-2.19 \leq f6/f \leq -0.43$ is satisfied.

A central curvature radius of the object side surface of the sixth lens L6 is R11, and a central curvature radius of the image side surface of the sixth lens L6 is R12, which satisfy a following relation: $-2.94 \leq (R11+R12)/(R11-R12) \leq -0.60$. In this way, the shape of the sixth lens L6 is specified. It is beneficial to correcting the aberration of off-axis angle of view within the range of the conditional expression. In an embodiment, $-1.84 \leq (R11+R12)/(R11-R12) \leq -0.75$ is satisfied.

An on-axis thickness of the sixth lens L6 is d11, and the total optical length of the camera optical lens 10 is TTL, which satisfy a following relation: $0.02 \leq d11/TTL \leq 0.16$. It is beneficial to realizing ultra-thinning within the range of the conditional expression. In an embodiment, $0.03 \leq d11/TTL \leq 0.13$ is satisfied.

In this embodiment, the focal length of the camera optical lens 10 is f, and the total optical length of the camera optical lens 10 is TTL, which satisfy a following relation: $f/TTL \geq 1.00$. It is beneficial to realizing a long focal length within the range of the conditional expression.

In this embodiment, the entire focal length of the camera optical lens 10 is f, and a combined focal length of the first lens L1 and the second lens L2 is f12, which satisfy the following condition: $0.33 \leq f12/f \leq 1.25$. Within the range of the conditional expression, the aberration and distortion of the camera optical lens 10 can be eliminated, and the back focal length of the camera optical lens 10 can be suppressed, thus maintaining the miniaturization of the imaging lens system. In an embodiment, $0.53 \leq f12/f \leq 1.00$ is satisfied.

When the above relation is satisfied, the camera optical lens 10 has a good optical performance and meanwhile can meet the design requirement for a long focal length. According to characteristics of the optical lens 10, the optical lens 10 is particularly suitable for mobile phone imaging lens assemblies and WEB imaging lenses composed of high-pixel CCDs, CMOSs and other imaging elements.

Next, the camera optical lens 10 of the present application will be described by way of examples. The symbols recorded in each example are as follows. The units of focal length, on-axis distance, central curvature radius, on-axis thickness, inflexion point position and arrest point position are mm.

TTL: total optical length (on-axis distance from the object side surface of the first lens L1 to the imaging plane), in units of mm;

F number FNO: a ratio of an effective focal length of the camera optical lens to an entrance pupil diameter.

In an embodiment, the object side surface and/or the image side surface of the lens can also be provided with inflexion points and/or arrest points to meet the requirements of high-quality imaging. Specific embodiments will be described as the following.

Table 1 and Table 2 show the design data of the camera optical lens 10 according to the first embodiment of the present application.

TABLE 1

|  | R | d | nd | vd |
|---|---|---|---|---|
| S1 | ∞ | d0 = −1.016 | | |
| R1 | 2.235 | d1 = 1.518 | nd1 1.5444 | v1 55.82 |
| R2 | −8.892 | d2 = 0.203 | | |
| R3 | 22.598 | d3 = 0.269 | nd2 1.6700 | v2 19.39 |
| R4 | 2.988 | d4 = 1.267 | | |
| R5 | −14.454 | d5 = 0.232 | nd3 1.5346 | v3 55.69 |
| R6 | −21265.906 | d6 = 0.617 | | |
| R7 | 6.873 | d7 = 0.314 | nd4 1.5346 | v4 55.69 |
| R8 | 3.129 | d8 = 1.004 | | |
| R9 | −3.407 | d9 = 0.557 | nd5 1.6700 | v5 19.39 |
| R10 | −1.634 | d10 = 0.030 | | |
| R11 | −2.011 | d11 = 0.543 | nd6 1.5346 | v6 55.69 |
| R12 | −13.653 | d12 = 0.207 | | |
| R13 | ∞ | d13 = 0.210 | ndg 1.5168 | vg 64.17 |
| R14 | ∞ | d14 = 0.466 | | |

The meaning of each symbol in Table 1 is as follows.
S1: aperture;
R: curvature radius at a center of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: center curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: center curvature radius of the object side surface of the sixth lens L6;
R12: central curvature radius of the image side surface of the sixth lens L6;
R13: central curvature radius of an object side surface of the optical filter GF;
R14: central curvature radius of an image side surface of the optical filter GF;
d: on-axis thickness of a lens and on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;

d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: Abbe number;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;
v6: Abbe number of the sixth lens L6;
vg: Abbe number of the optical filter GF.

Table 2 shows aspheric surface data of each lens in the camera optical lens 10 according to the first embodiment of the present application.

In Table 2, k is a conic coefficient, and A4, A6, A8, A10, A12, A14, A16, A18 and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

In the above formula, x is a vertical distance between the point on the aspheric curve and the optical axis, and y is a depth of aspheric surface (a vertical distance between a point having a distance of x from the optical axis on the aspheric surface, and a tangent plane to the vertex on the aspheric optical axis).

For convenience, the aspheric surface of each lens surface uses the aspheric surface shown in the above formula (1). However, the present application is not limited to the aspheric polynomial form expressed by the formula (1).

Table 3 and Table 4 show design data of inflexion points and arrest points of respective lenses in the camera optical lens 10 according to the first embodiment of the present application. P1R1 and P1R2 represent the object side surface and image side surface of the first lens L1 respectively, P2R1 and P2R2 represent the object side surface and image side surface of the second lens L2 respectively, P3R1 and P3R2 represent the object side surface and image side surface of the third lens L3 respectively, P4R1 and P4R2 represent the object side surface and image side surface of the fourth lens L4 respectively, P5R1 and P5R2 represent the object side surface and image side surface of the fifth lens L5 respectively, and P6R1 and P6R2 represent the object side surface and image side surface of the sixth lens L6 respectively. The data in the column named "inflexion point position" is vertical distances from the inflexion points arranged on respective lens surfaces to the optical axis of the camera optical lens 10. The data in the column named "arrest

TABLE 2

| | Conic coefficient | Aspheric coefficient | | | | |
| --- | --- | --- | --- | --- | --- | --- |
| | k | A4 | A6 | A8 | A10 | A12 |
| R1 | −3.7027E−01 | 2.6130E−03 | 1.3816E−03 | −2.2089E−03 | 2.7935E−03 | −2.0725E−03 |
| R2 | −6.4070E+01 | 5.1509E−03 | 9.3582E−03 | −1.5622E−02 | 1.3739E−02 | −7.5945E−03 |
| R3 | 8.4020E+01 | 2.8532E−02 | 6.1286E−02 | −8.2655E−02 | 8.4624E−02 | −5.9878E−02 |
| R4 | −1.0486E+01 | 1.1994E−02 | 4.5028E−02 | −6.2972E−02 | 6.5607E−02 | −3.5212E−02 |
| R5 | 9.5337E+01 | 6.1300E−02 | −2.1605E−03 | −1.8719E−03 | −8.2445E−03 | 1.5474E−01 |
| R6 | −9.9000E+01 | 4.8708E−02 | 1.3286E−02 | −3.2993E−02 | −3.1988E−02 | 5.9853E−02 |
| R7 | −2.8613E+01 | −1.9939E−01 | −1.7335E−02 | 3.1768E−01 | −9.0929E−01 | 1.5645E+00 |
| R8 | −4.9758E+01 | −5.8521E−03 | −3.4415E−01 | 8.1416E−01 | −1.2047E+00 | 1.1989E+00 |
| R9 | 3.3968E+00 | 6.2974E−02 | −8.5282E−02 | −3.7489E−02 | 1.7134E−01 | −1.8467E−01 |
| R10 | −9.0761E−01 | 2.0729E−01 | −4.6146E−01 | 5.4724E−01 | −3.9839E−01 | 1.6736E−01 |
| R11 | −1.4634E+00 | 3.6909E−01 | −3.6832E−01 | 7.0903E−01 | −7.1532E−01 | 4.2852E−01 |
| R12 | 3.9871E+01 | −2.2849E−01 | 2.3119E−01 | −1.4659E−01 | 5.4987E−02 | −1.0257E−02 |

| | Conic coefficient | Aspheric coefficient | | | |
| --- | --- | --- | --- | --- | --- |
| | k | A14 | A16 | A18 | A20 |
| R1 | −3.7027E−01 | 9.3866E−04 | −2.5464E−04 | 3.8058E−05 | −2.4407E−06 |
| R2 | −6.4070E+01 | 2.6436E−03 | −5.6255E−05 | 6.6743E−05 | −3.3952E−06 |
| R3 | 8.4020E+01 | 2.7805E−02 | −8.0222E−03 | 1.3010E−03 | −9.0293E−05 |
| R4 | −1.0486E+01 | 1.0944E−03 | 9.7712E−03 | −4.9229E−03 | 8.0179E−04 |
| R5 | 9.5337E+01 | −1.7585E−01 | 1.2110E−01 | −4.6659E−02 | 7.6738E−03 |
| R6 | −9.9000E+01 | −7.2229E−02 | 5.2940E−02 | −1.9276E−02 | 2.7476E−03 |
| R7 | −2.8613E+01 | −1.7092E+00 | 1.1265E+00 | −3.9856E−01 | 5.7598E−02 |
| R8 | −4.9758E+01 | −7.7386E−01 | 3.0374E−01 | −6.2063E−02 | 4.4695E−03 |
| R9 | 3.3968E+00 | 9.5024E−02 | −1.9904E−02 | −1.6059E−03 | 9.7262E−04 |
| R10 | −9.0761E−01 | −3.4510E−02 | 1.1763E−03 | 4.8833E−04 | −1.3287E−05 |
| R11 | −1.4634E+00 | −1.5708E−01 | 3.4675E−02 | −4.2403E−03 | 2.2089E−04 |
| R12 | 3.9871E+01 | −5.6417E−04 | 7.6690E−04 | −1.5971E−04 | 1.1657E−05 | point position" is vertical distances from the arrest points arranged on respective lens surfaces to the optical axis of the camera optical lens 10.

TABLE 3

| | Number of inflexion points | Inflexion point position 1 | Inflexion point position2 |
|---|---|---|---|
| P1R1 | 1 | 1.905 | — |
| P1R2 | 2 | 0.855 | 1.435 |
| P2R1 | 0 | — | — |
| P2R2 | 0 | — | — |
| P3R1 | 2 | 0.325 | 0.795 |
| P3R2 | 2 | 0.015 | 0.775 |
| P4R1 | 2 | 0.245 | 1.115 |
| P4R2 | 2 | 0.395 | 1.045 |
| P5R1 | 0 | — | — |
| P5R2 | 1 | 1.565 | — |
| P6R1 | 1 | 1.345 | — |
| P6R2 | 1 | 1.935 | — |

TABLE 4

| | Number of arrest points | Arrest point position 1 | Arrest point position 2 |
|---|---|---|---|
| P1R1 | 0 | — | — |
| P1R2 | 0 | — | — |
| P2R1 | 0 | — | — |
| P2R2 | 0 | — | — |
| P3R1 | 2 | 0.585 | 0.905 |
| P3R2 | 2 | 0.015 | 0.955 |
| P4R1 | 1 | 0.425 | — |
| P4R2 | 2 | 0.735 | 1.175 |
| P5R1 | 0 | — | — |
| P5R2 | 0 | — | — |
| P6R1 | 0 | — | — |
| P6R2 | 0 | — | — |

Figure 2:
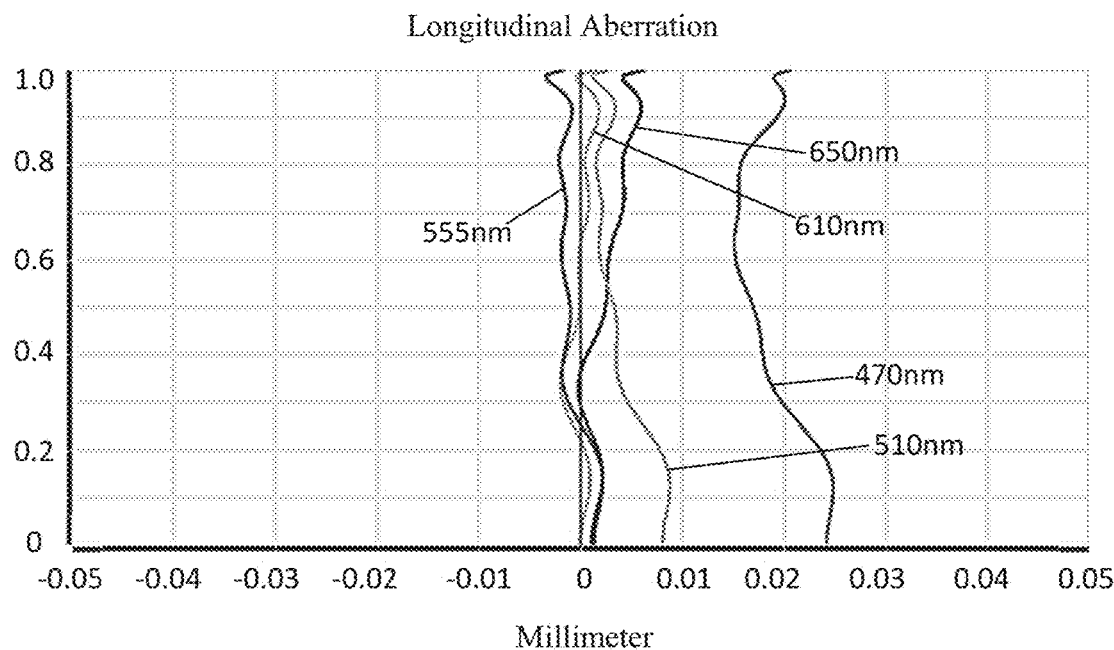
FIG. 2 is a schematic diagram of a longitudinal aberration of the camera optical lens shown in FIG. 1.
Figure 3:
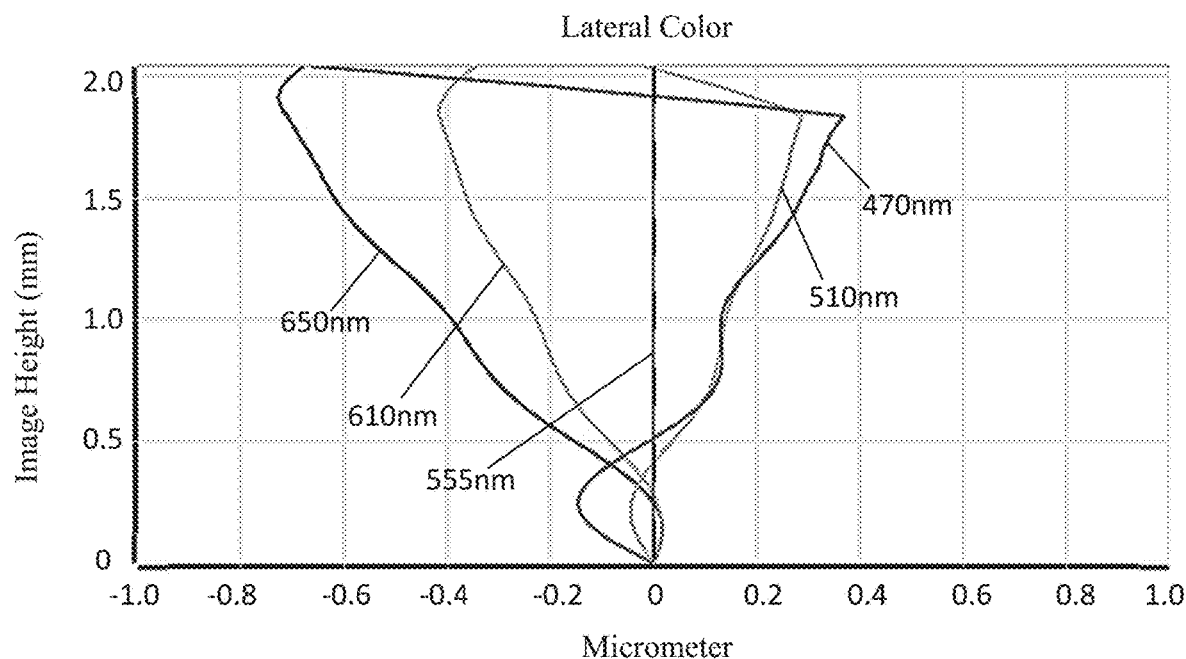
FIG. 3 is a schematic diagram of a lateral color of the camera optical lens shown in FIG. 1.
Figure 4:
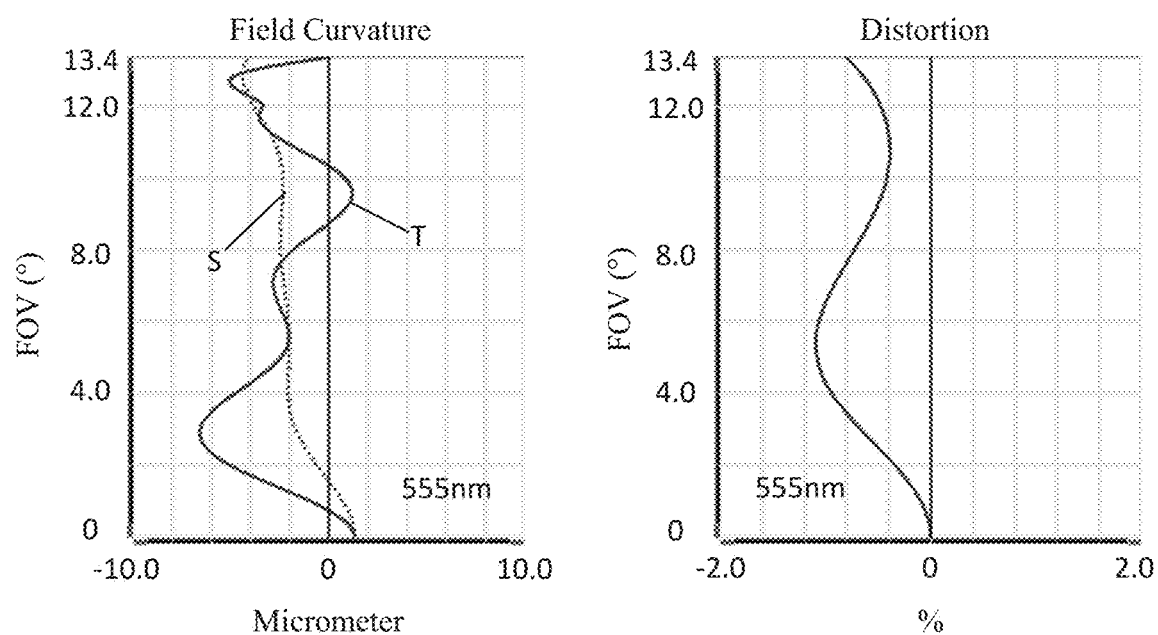
FIG. 4 is schematic diagrams of a field curvature and a distortion of the camera optical lens shown in FIG. 1.
Figure 5:
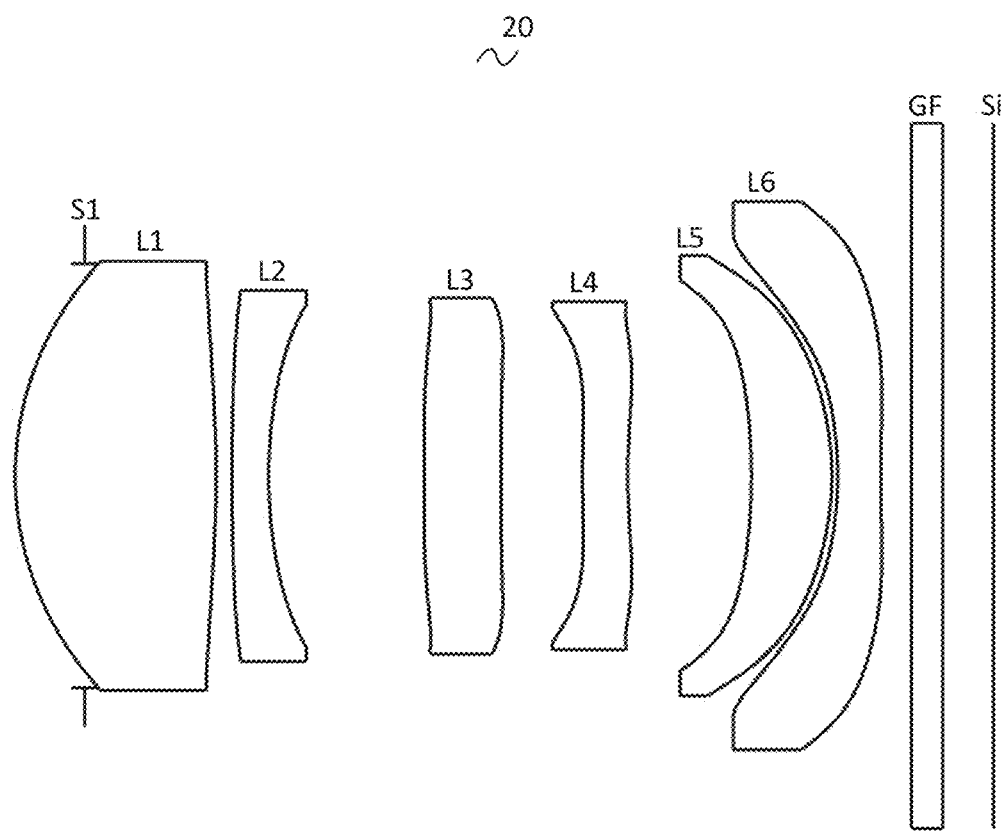
FIG. 5 is a schematic structural diagram of a camera optical lens according to a second embodiment of the present application.

FIG. 2 and FIG. 3 respectively show a longitudinal aberration and a lateral color of light with wavelengths of 650 nm, 610 nm, 555 nm, 510 nm and 470 nm after passing through the camera optical lens 10 of the first embodiment. FIG. 4 is a schematic diagram showing a field curvature and a distortion of light with a wavelength of 555 nm after passing through the camera optical lens 10 of the first embodiment. A field curvature S in FIG. 4 is a field curvature in a sagittal direction and T is a field curvature in a tangential direction.

Table 21 below shows the values corresponding to the parameters specified in the conditional expressions for various numerical values in the first, second, third, fourth and fifth embodiments.

As shown in Table 21, the camera optical lens according to the first embodiment satisfies respective conditions.

In this embodiment, the entrance pupil diameter ENPD of the camera optical lens is 3.902 mm, the full field image height IH is 2.040 mm, and the field of view FOV in a diagonal direction is 26.80°. The camera optical lens 10 meets the design requirements for a long focal length, and its on-axis and off-axis aberrations are sufficiently corrected, thereby leading to better optical characteristics.

Second Embodiment

The second embodiment is basically the same as the first embodiment, and involves symbols having the same meanings as the first embodiment. Only differences therebetween will be listed below.

In this embodiment, the image side surface of the sixth lens L6 is concave at the paraxial position.

Table 5 and Table 6 show design data of the camera optical lens 20 according to the second embodiment of the present application.

TABLE 5

| | R | d | nd | vd |
|---|---|---|---|---|
| S1 | ∞ | d0 = −0.471 | | |
| R1 | 2.252 | d1 = 1.362 | nd1 1.5444 | v1 55.82 |
| R2 | −9.571 | d2 = 0.109 | | |
| R3 | 17.745 | d3 = 0.249 | nd2 1.6700 | v2 19.39 |
| R4 | 3.515 | d4 = 1.055 | | |
| R5 | −121.890 | d5 = 0.522 | nd3 1.5346 | v3 55.69 |
| R6 | −185.273 | d6 = 0.549 | | |
| R7 | 8.249 | d7 = 0.307 | nd4 1.5346 | v4 55.69 |
| R8 | 4.164 | d8 = 0.839 | | |
| R9 | −4.769 | d9 = 0.546 | nd5 1.6700 | v5 19.39 |
| R10 | −2.059 | d10 = 0.040 | | |
| R11 | −2.391 | d11 = 0.294 | nd6 1.5346 | v6 55.69 |
| R12 | 42.771 | d12 = 0.207 | | |
| R13 | ∞ | d13 = 0.210 | ndg 1.5168 | vg 64.17 |
| R14 | ∞ | d14 = 0.345 | | |

Table 6 shows aspheric surface data of respective lenses in the camera optical lens 20 according to the second embodiment of the present application.

TABLE 6

| | Conic coefficient | Aspheric coefficient | | | | |
|---|---|---|---|---|---|---|
| | k | A4 | A6 | A8 | A10 | A12 |
| R1 | −3.5211E−01 | 3.1943E−03 | 2.8415E−04 | 7.4875E−04 | −1.4831E−03 | 1.6524E−03 |
| R2 | −5.2178E+01 | −1.4086E−02 | 7.3153E−02 | −1.4009E−01 | 1.8000E−01 | −1.6161E−01 |
| R3 | 9.1614E+01 | −4.7210E−02 | 1.3831E−01 | −2.3246E−01 | 2.8377E−01 | −2.5252E−01 |
| R4 | −9.8720E+00 | 2.7031E−03 | 8.0643E−02 | −1.0996E−01 | 1.0728E−01 | −7.0346E−02 |
| R5 | −9.9000E+01 | 4.9621E−02 | 8.2344E−03 | −2.7699E−02 | 1.9104E−02 | −9.3050E−03 |
| R6 | 9.9000E+01 | 2.8345E−02 | 1.3174E−02 | −4.0831E−02 | 1.3270E−02 | 1.4343E−03 |
| R7 | 2.0396E+00 | −1.7379E−01 | 3.9380E−02 | 5.2202E−02 | −4.2267E−01 | 9.7689E−01 |
| R& | −6.3840E+01 | −5.2550E−02 | −1.0318E−01 | 2.5849E−01 | −4.8695E−01 | 6.4836E−01 |
| R9 | 4.0972E+00 | −4.0986E−02 | 4.7208E−02 | −2.0965E−02 | −6.2965E−02 | 5.2466E−02 |
| R10 | −5.5648E−01 | 9.6023E−02 | −2.7786E−01 | 4.9935E−01 | −6.3845E−01 | 5.1876E−01 |
| R11 | −4.0416E−01 | 1.9602E−01 | −6.5778E−01 | 9.1959E−01 | −8.5953E−01 | 5.8590E−01 |
| R12 | 1.0145E+01 | 7.8801E−02 | −3.1796E−01 | 3.5728E−01 | −2.2417E−01 | 8.7618E−02 |

TABLE 6-continued

| | Conic coefficient | Aspheric coefficient | | | |
|---|---|---|---|---|---|
| | k | A14 | A16 | A18 | A20 |
| R1 | −3.5211E−01 | −1.0823E−03 | 4.1896E−04 | −8.9726E−05 | 8.2053E−06 |
| R2 | −5.2178E+01 | 9.8715E−02 | −3.8914E−02 | 8.9102E−03 | −8.9863E−04 |
| R3 | 9.1614E+01 | 1.5708E−01 | −6.4448E−02 | 1.5733E−02 | −1.7346E−03 |
| R4 | −9.8720E+00 | 2.8735E−02 | −7.3276E−03 | 1.8235E−03 | −3.8765E−04 |
| R5 | −9.9000E+01 | −1.0789E−02 | 1.8866E−02 | −1.1191E−02 | 2.4298E−03 |
| R6 | 9.9000E+01 | −2.4333E−02 | 2.5502E−02 | −9.7835E−03 | 1.3327E−03 |
| R7 | 2.0396E+00 | −1.2556E+00 | 9.2308E−01 | −3.5530E−01 | 5.4207E−02 |
| R8 | −6.3840E+01 | −5.6339E−01 | 3.0561E−01 | −9.0450E−02 | 1.0909E−02 |
| R9 | 4.0972E+00 | 1.2466E−02 | −3.7663E−02 | 1.9068E−02 | −3.1506E−03 |
| R10 | −5.5648E−01 | −2.6001E−01 | 7.6660E−02 | −1.2074E−02 | 7.8646E−04 |
| R11 | −4.0416E−01 | −2.7617E−01 | 8.2100E−02 | −1.3578E−02 | 9.4494E−04 |
| R12 | 1.0145E+01 | −2.1891E−02 | 3.3821E−03 | −2.9355E−04 | 1.1056E−05 |

Table 7 and Table 8 show design data of inflexion points and arrest points of respective lenses in the camera optical lens 20 according to the second embodiment of the present application.

TABLE 7

| | Number of inflexion points | Inflexion point position 1 | Inflexion point position 2 |
|---|---|---|---|
| P1R1 | 0 | — | — |
| P1R2 | 2 | 0.885 | 1.375 |
| P2R1 | 0 | — | — |
| P2R2 | 0 | — | — |
| P3R1 | 2 | 0.125 | 0.955 |
| P3R2 | 2 | 0.125 | 0.735 |
| P4R1 | 2 | 0.255 | 1.125 |
| P4R2 | 2 | 0.385 | 1.025 |
| P5R1 | 0 | — | — |
| P5R2 | 1 | 1.495 | — |
| P6R1 | 1 | 1.445 | — |
| P6R2 | 2 | 0.405 | 1.935 |

TABLE 8

| | Number of arrest points | Arrest point position 1 | Arrest point position 2 |
|---|---|---|---|
| P1R1 | 0 | — | — |
| P1R2 | 0 | — | — |
| P2R1 | 0 | — | — |
| P2R2 | 0 | — | — |
| P3R1 | 2 | 0.205 | 1.155 |
| P3R2 | 2 | 0.215 | 0.895 |
| P4R1 | 1 | 0.435 | — |
| P4R2 | 2 | 0.685 | 1.165 |
| P5R1 | 0 | — | — |
| P5R2 | 0 | — | — |
| P6R1 | 0 | — | — |
| P6R2 | 1 | 0.575 | — |

Figure 6:
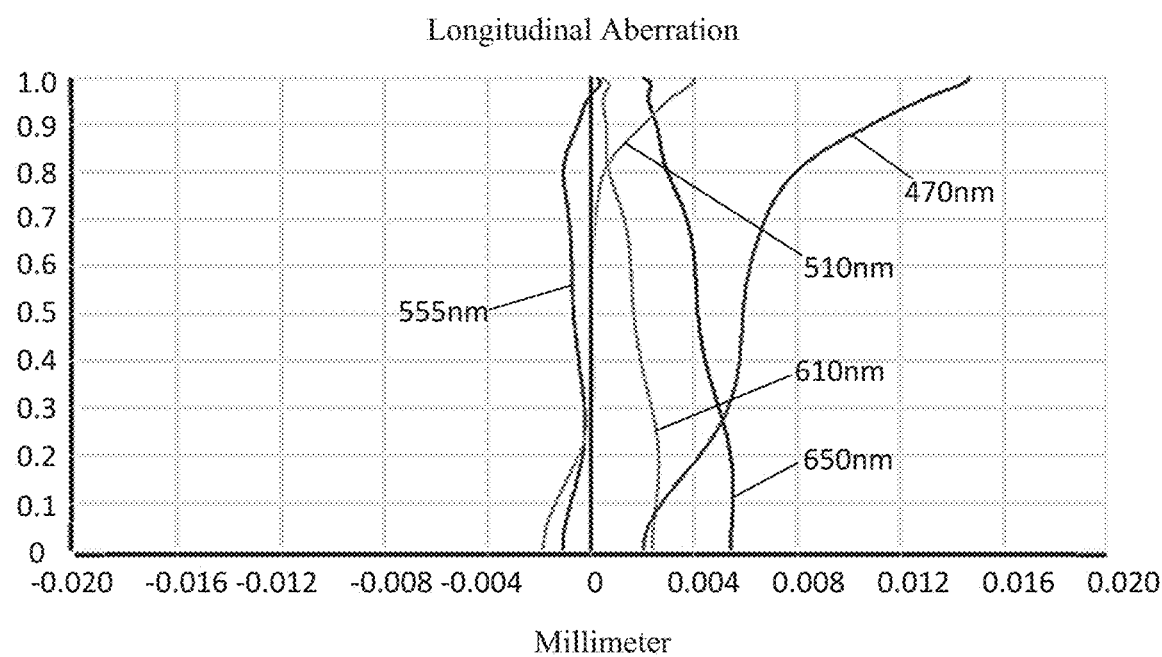
FIG. 6 is a schematic diagram of a longitudinal aberration of the camera optical lens shown in FIG. 5.
Figure 7:
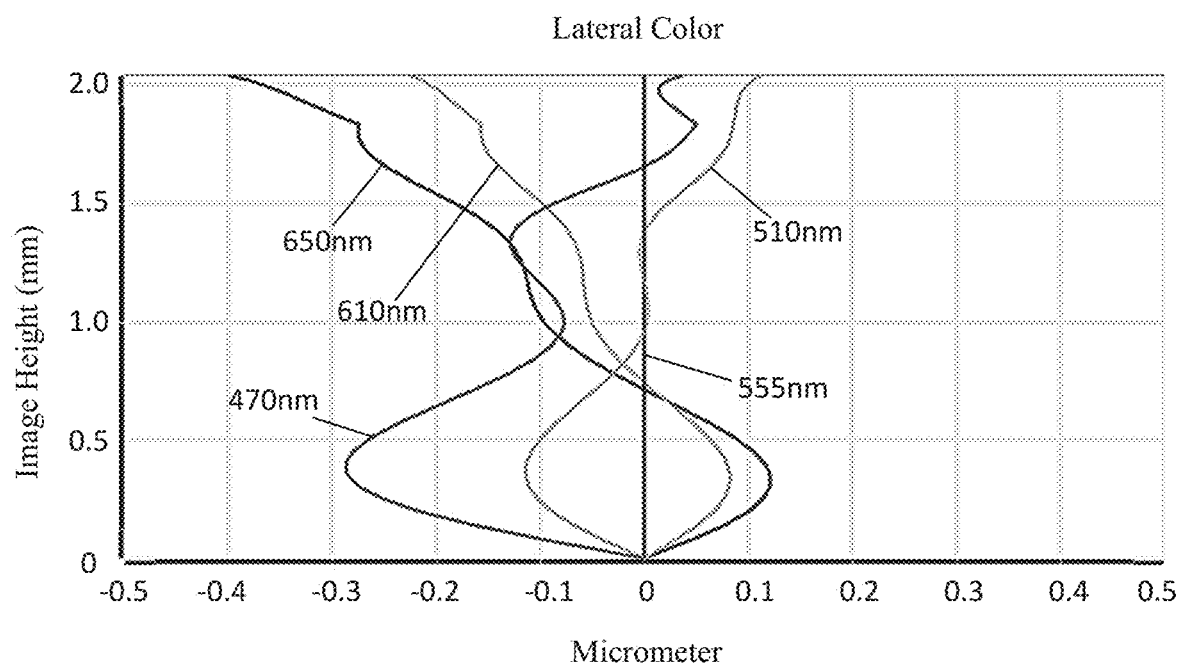
FIG. 7 is a schematic diagram of a lateral color of the camera optical lens shown in FIG. 5.
Figure 8:
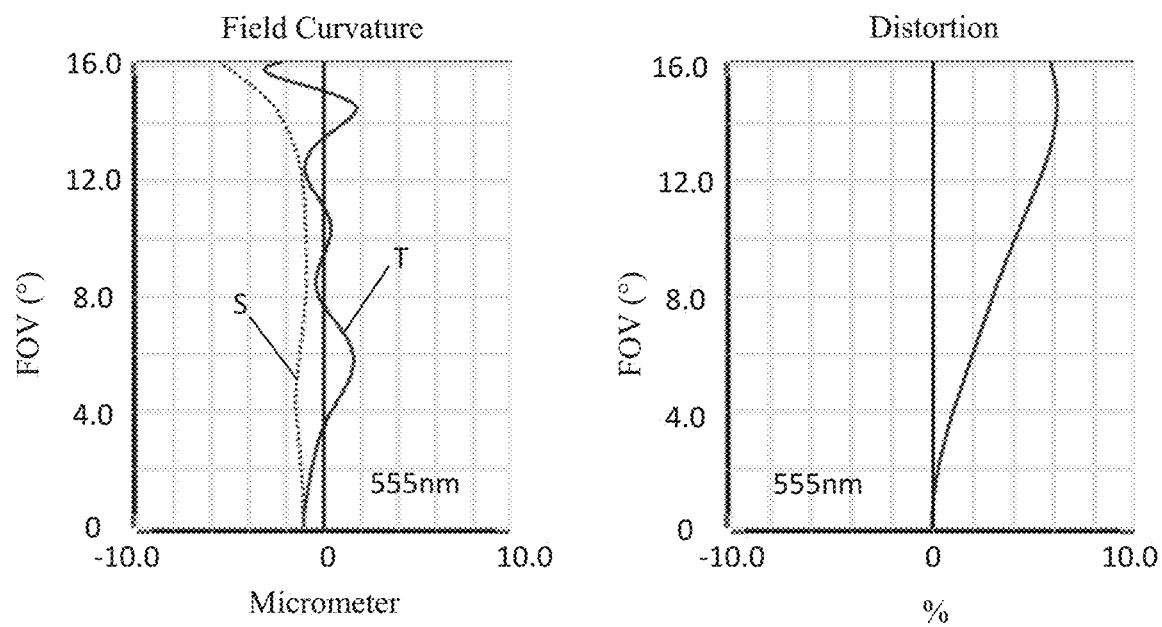
FIG. 8 is schematic diagrams of a field curvature and a distortion of the camera optical lens shown in FIG. 5.
Figure 9:
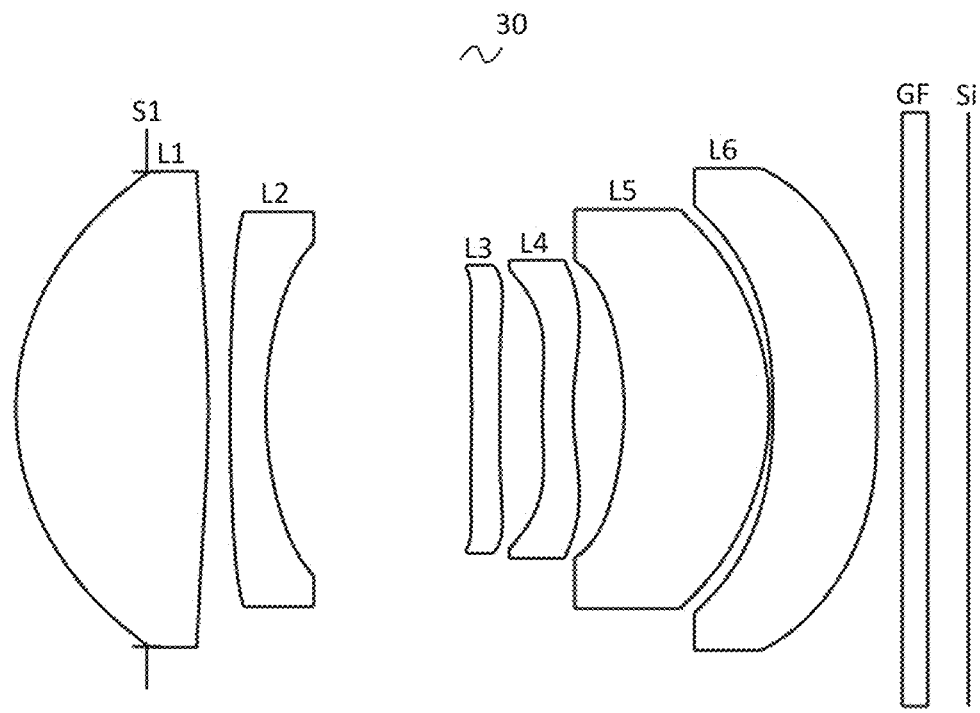
FIG. 9 is a schematic structural diagram of a camera optical lens according to a third embodiment of the present application.

FIG. 6 and FIG. 7 respectively show a longitudinal aberration and a lateral color of light with wavelengths of 650 nm, 610 nm, 555 nm, 510 nm and 470 nm after passing through the camera optical lens 20 of the second embodiment. FIG. 8 shows a schematic diagram of a field curvature and a distortion of light with a wavelength of 555 nm after passing through the camera optical lens 20 of the second embodiment.

As shown in Table 21, the camera optical lens according to the second embodiment satisfies respective conditions.

In this embodiment, the entrance pupil diameter ENPD of the camera optical lens is 3.008 mm, the full field image height IH is 2.040 mm, and the field of view FOV in a diagonal direction is 32.00°. The camera optical lens 20 meets the design requirements for a long focal length, and its on-axis and off-axis aberrations are sufficiently corrected, thereby leading to better optical characteristics.

Third Embodiment 3

The third embodiment is basically the same as the first embodiment, and involves symbols having the same meanings as the first embodiment. Only differences therebetween will be listed below.

Table 9 and Table 10 show design data of the camera optical lens 30 according to the third embodiment of the present application.

TABLE 9

| | R | d | nd | vd |
|---|---|---|---|---|
| S1 | ∞ | d0 = −1.072 | | |
| R1 | 2.262 | d1 = 1.573 | nd1 1.5444 | v1 55.82 |
| R2 | −9.385 | d2 = 0.179 | | |
| R3 | 18.116 | d3 = 0.292 | nd2 1.6700 | v2 19.39 |
| R4 | 3.110 | d4 = 1.686 | | |
| R5 | −10.803 | d5 = 0.230 | nd3 1.5346 | v3 55.69 |
| R6 | −1079.602 | d6 = 0.348 | | |
| R7 | 4.320 | d7 = 0.253 | nd4 1.5346 | v4 55.69 |
| R8 | 2.524 | d8 = 0.417 | | |
| R9 | −2.511 | d9 = 1.188 | nd5 1.6700 | v5 19.39 |
| R10 | −2.271 | d10 = 0.030 | | |
| R11 | −6.672 | d11 = 0.852 | nd6 1.5346 | v6 55.69 |
| R12 | −34.974 | d12 = 0.207 | | |
| R13 | ∞ | d13 = 0.210 | ndg 1.5168 | vg 64.17 |
| R14 | ∞ | d14 = 0.333 | | |

Table 10 shows aspheric surface data of respective lenses in the camera optical lens 30 according to the third embodiment of the present application.

TABLE 10

| | Conic coefficient | Aspheric coefficient | | | | |
|---|---|---|---|---|---|---|
| | k | A4 | A6 | A8 | A10 | A12 |
| R1 | −3.1293E−01 | 1.8647E−03 | 1.2751E−04 | 2.8819E−04 | −3.8379E−04 | 3.0068E−04 |
| R2 | −9.0832E+01 | 9.5632E−03 | −1.0805E−02 | 1.0701E−02 | −7.0434E−03 | 3.0828E−03 |
| R3 | 8.6057E+01 | −1.1411E−04 | −1.6234E−02 | 2.7055E−02 | −2.3508E−02 | 1.3654E−02 |
| R4 | −6.7067E+00 | 1.8780E−02 | −9.8478E−03 | 3.6254E−02 | −5.3301E−02 | 5.6939E−02 |
| R5 | 4.2439E+01 | 9.2593E−02 | −1.2311E−01 | 3.8962E−01 | −9.2813E−01 | 1.3381E+00 |
| R6 | 7.2291E−02 | −1.7297E−01 | 6.0016E−01 | −1.2965E+00 | 1.6504E+00 | −1.2899E+00 |
| R7 | −1.2993E+02 | −1.1364E−02 | −1.0455E+00 | 2.7641E+00 | −4.6474E+00 | 5.3914E+00 |
| R8 | −3.4266E+01 | 1.6311E−01 | −1.2147E+00 | 2.8806E+00 | −4.5204E+00 | 4.9572E+00 |
| R9 | 1.5859E+00 | 1.3896E−01 | −2.4605E−01 | 3.1327E−01 | −3.9481E−01 | 4.9132E−01 |
| R10 | −1.4902E+00 | −8.7850E−02 | 3.2736E−01 | −6.0714E−01 | 6.1294E−01 | −3.6131E−01 |
| R11 | 1.2243E+01 | −2.6231E−01 | 6.0821E−01 | −9.3675E−01 | 8.8065E−01 | −5.0612E−01 |
| R12 | 2.6888E+02 | −2.2995E−01 | 2.6066E−01 | −2.2914E−01 | 1.4146E−01 | −5.9775E−02 |

| | Conic coefficient | Aspheric coefficient | | | |
|---|---|---|---|---|---|
| | k | A14 | A16 | A18 | A20 |
| R1 | −3.1293E−01 | −1.3454E−04 | 3.4370E−05 | −4.6579E−06 | 2.4919E−07 |
| R2 | −9.0832E+01 | −8.9205E−04 | 1.6255E−05 | −1.6787E−05 | 7.4562E−07 |
| R3 | 8.6057E+01 | −5.4003E−03 | 1.3880E−03 | −2.0626E−04 | 1.3387E−05 |
| R4 | −6.7067E+00 | −4.0845E−02 | 1.8606E−02 | −4.8243E−03 | 5.5158E−04 |
| R5 | 4.2439E+01 | −1.2038E+00 | 6.5006E−01 | −1.9262E−01 | 2.3727E−02 |
| R6 | 7.2291E−02 | 5.7543E−01 | −1.2824E+00 | 1.0283E+00 | 0.0000E+00 |
| R7 | −1.2993E+02 | −4.2561E+00 | 2.1533E+00 | −6.2042E−01 | 7.7061E−02 |
| R8 | −3.4266E+01 | −3.7267E+00 | 1.8099E+00 | −5.0583E−01 | 6.1324E−02 |
| R9 | 1.5859E+00 | −4.7008E−01 | 2.7683E−01 | −8.8255E−02 | 1.1555E−02 |
| R10 | −1.4902E+00 | 1.2305E−01 | −2.2021E−02 | 1.4353E−03 | 4.3532E−05 |
| R11 | 1.2243E+01 | 1.7427E−01 | −3.3549E−02 | 2.9913E−03 | −5.8111E−05 |
| R12 | 2.6888E+02 | 1.6726E−02 | −2.9523E−03 | 2.9794E−04 | −1.3191E−05 |

Table 11 and Table 12 show design data of inflexion points and arrest points of respective lenses in the camera optical lens 30 according to the third embodiment of the present application.

TABLE 11

| | Number of inflexion points | Inflexion point position 1 | Inflexion point position 2 |
|---|---|---|---|
| P1R1 | 0 | — | — |
| P1R2 | 2 | 1.025 | 1.595 |
| P2R1 | 0 | — | — |
| P2R2 | 0 | — | — |
| P3R1 | 2 | 0.345 | 0.825 |
| P3R2 | 1 | 0.785 | — |
| P4R1 | 2 | 0.275 | 1.125 |
| P4R2 | 1 | 0.405 | — |
| P5R1 | 0 | — | — |
| P5R2 | 1 | 1.615 | — |
| P6R1 | 1 | 1.705 | — |
| P6R2 | 0 | — | — |

TABLE 12

| | Number of arrest points | Arrest point position 1 | Arrest point position 2 |
|---|---|---|---|
| P1R1 | 0 | — | — |
| P1R2 | 0 | — | — |
| P2R1 | 0 | — | — |
| P2R2 | 0 | — | — |
| P3R1 | 2 | 0.625 | 0.935 |
| P3R2 | 1 | 0.945 | — |
| P4R1 | 1 | 0.455 | — |
| P4R2 | 1 | 0.715 | — |
| P5R1 | 0 | — | — |
| P5R2 | 0 | — | — |
| P6R1 | 0 | — | — |
| P6R2 | 0 | — | — |

Figure 10:
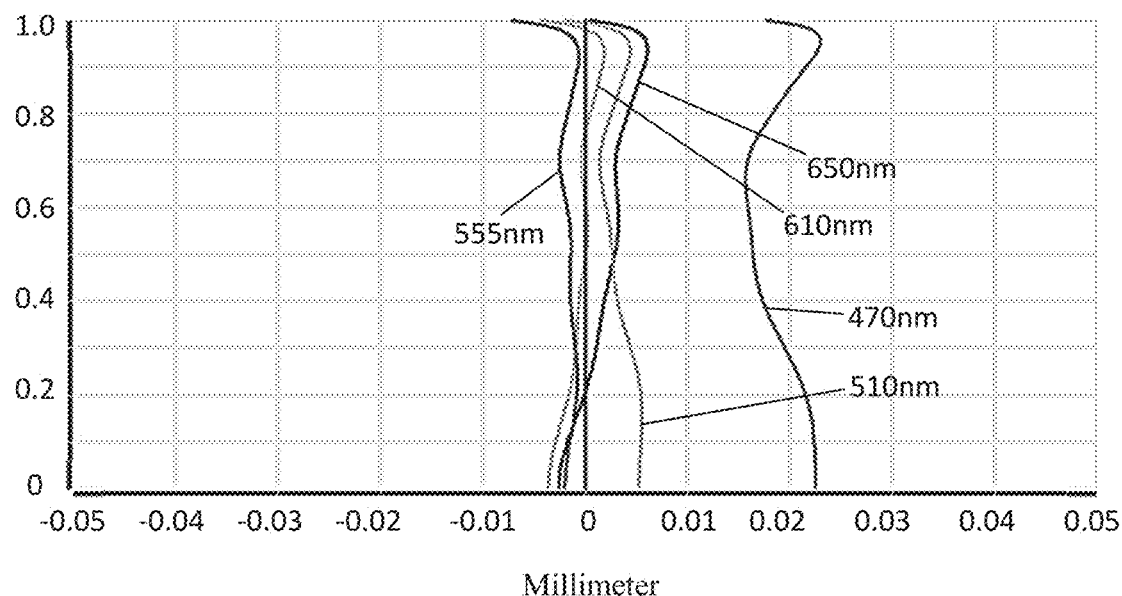
FIG. 10 is a schematic diagram of a longitudinal aberration of the camera optical lens shown in FIG. 9.
Figure 11:
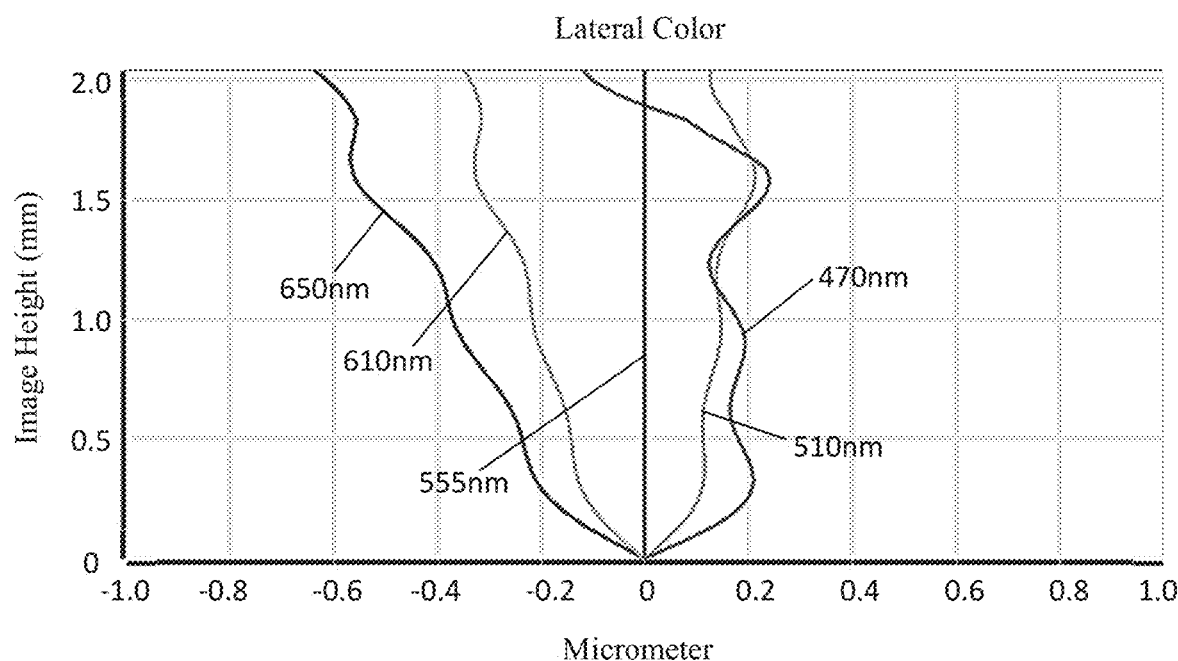
FIG. 11 is a schematic diagram of a lateral color of the camera optical lens shown in FIG. 9.
Figure 12:
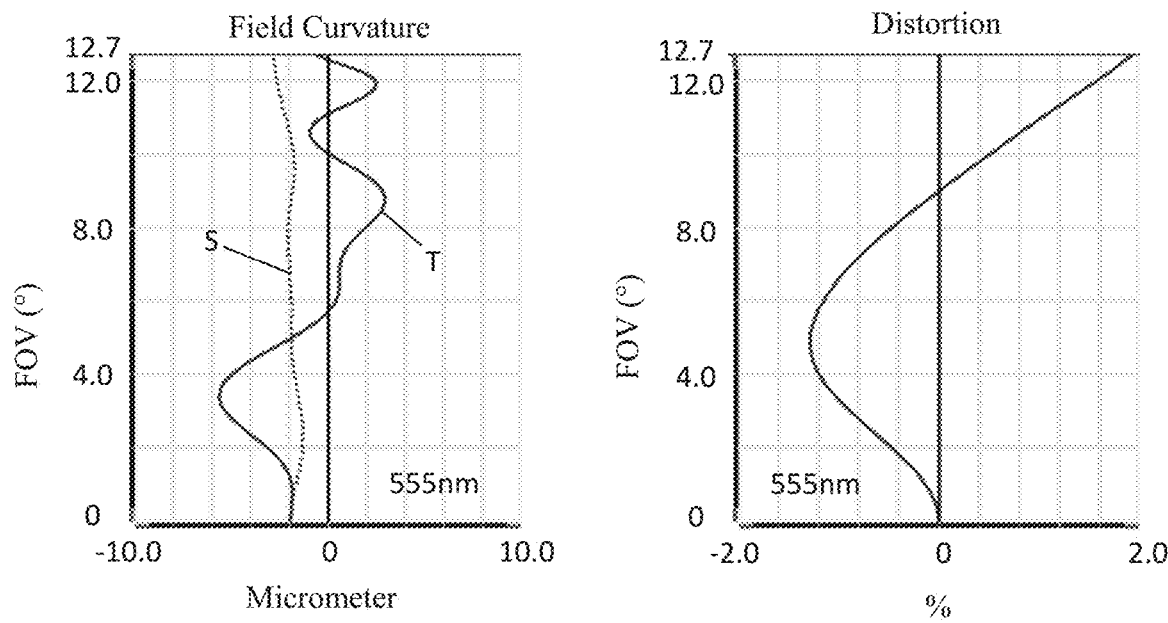
FIG. 12 is schematic diagrams of a field curvature and a distortion of the camera optical lens shown in FIG. 9.
Figure 13:
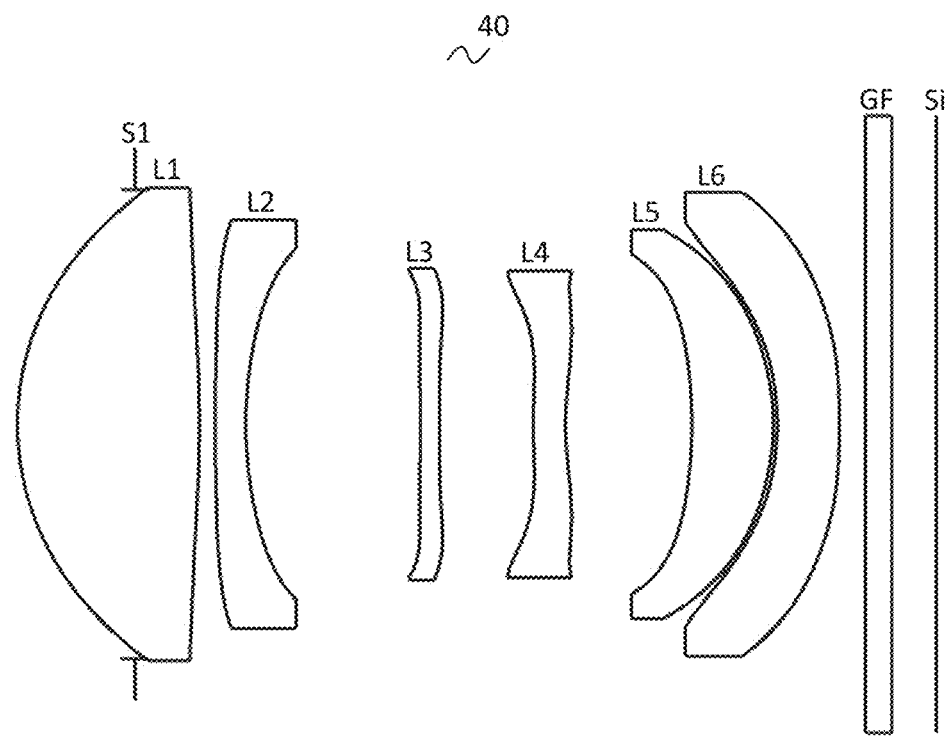
FIG. 13 is a schematic structural diagram of a camera optical lens according to a fourth embodiment of the present application.

FIG. 10 and FIG. 11 respectively show a longitudinal aberration and a lateral color of light with wavelengths of 650 nm, 610 nm, 555 nm, 510 nm and 470 nm after passing through the camera optical lens 30 of the third embodiment. FIG. 12 shows a schematic diagram of a field curvature and a distortion of light with a wavelength of 555 nm after passing through the camera optical lens 30 of the third embodiment.

Table 21 below lists values corresponding to respective conditions in this embodiment according to the above conditions. Obviously, the camera optical system of this embodiment satisfies the above conditions.

In this embodiment, the entrance pupil diameter ENPD of the camera optical lens is 4.002 mm, the full field image height IH is 2.040 mm, and the field of view FOV in a diagonal direction is 25.40°. The camera optical lens 30 meets the design requirements for a long focal length, and its on-axis and off-axis aberrations are sufficiently corrected, thereby leading to better optical characteristics.

Fourth Embodiment

The fourth embodiment is basically the same as the first embodiment, and symbols having the same meanings as the first embodiment. Only the differences therebetween will be listed below.

Table 13 and Table 14 show design data of the camera optical lens 40 according to the fourth embodiment of the present application.

TABLE 13

| | R | d | nd | vd |
|---|---|---|---|---|
| S1 | ∞ | d0 = −0.931 | | |
| R1 | 2.199 | d1 = 1.437 | nd1 1.5444 | v1 55.82 |
| R2 | −10.277 | d2 = 0.125 | | |
| R3 | 19.688 | d3 = 0.242 | nd2 1.6700 | v2 19.39 |
| R4 | 3.361 | d4 = 1.380 | | |
| R5 | −12.042 | d5 = 0.150 | nd3 1.5346 | v3 55.69 |
| R6 | −126.423 | d6 = 0.741 | | |
| R7 | 6.314 | d7 = 0.255 | nd4 1.5346 | v4 55.69 |
| R8 | 2.606 | d8 = 0.998 | | |
| R9 | −3.700 | d9 = 0.644 | nd5 1.6700 | v5 19.39 |
| R10 | −1.710 | d10 = 0.030 | | |
| R11 | −2.101 | d11 = 0.488 | nd6 1.5346 | v6 55.69 |
| R12 | −13.873 | d12 = 0.207 | | |
| R13 | ∞ | d13 = 0.210 | ndg 1.5168 | vg 64.17 |
| R14 | ∞ | d14 = 0.351 | | |

Table 14 shows aspheric surface data of respective lenses in the camera optical lens 40 according to the fourth embodiment of the present application.

TABLE 14

| | Conic coefficient | Aspheric coefficient | | | | |
|---|---|---|---|---|---|---|
| | k | A4 | A6 | A8 | A10 | A12 |
| R1 | −3.5980E−01 | 2.7210E−03 | 1.6877E−03 | −2.7347E−03 | 3.6171E−03 | −2.8185E−03 |
| R2 | −6.2643E+01 | 1.7269E−04 | 1.7552E−02 | −2.3029E−02 | 1.8917E−02 | −1.0536E−02 |
| R3 | 8.3014E+01 | −2.9676E−02 | 5.8225E−02 | −7.1769E−02 | 7.1762E−02 | −5.2676E−02 |
| R4 | −1.1642E+01 | 1.3027E−02 | 3.6800E−02 | −5.8315E−02 | 8.5742E−02 | −8.6710E−02 |
| R5 | 8.1421E+01 | 9.8154E−02 | −2.8866E−02 | −1.2586E−01 | 2.4243E−01 | −2.5427E−01 |
| R6 | 8.8784E−02 | −4.7066E−02 | −4.4715E−02 | 6.5232E−03 | 1.1366E−01 | −2.1702E−01 |
| R7 | −2.9418E+01 | −2.4027E−01 | 9.2847E−02 | −3.0323E−01 | 1.0191E+00 | −1.9182E+00 |
| R8 | −5.6453E+01 | 1.2380E−01 | −9.6968E−01 | 2.6093E+00 | −4.7447E+00 | 5.9950E+00 |
| R9 | 4.1832E+00 | 4.9187E−02 | −7.7401E−02 | −6.6772E−01 | 5.1819E−02 | 4.0416E−02 |
| R10 | −9.0470E−01 | 2.3407E−01 | −6.4030E−01 | 9.8187E−01 | −9.8345E−01 | 6.5700E−01 |
| R11 | −1.2313E+00 | 9.1086E−02 | −6.1754E−01 | 1.2705E+00 | −1.4333E+00 | 9.8159E−01 |
| R12 | 3.6953E+01 | −2.3849E−01 | 2.3878E−01 | −1.2102E−01 | 6.3352E−03 | 2.6858E−02 |

| | Conic coefficient | Aspheric coefficient | | | |
|---|---|---|---|---|---|
| | k | A14 | A16 | A18 | A20 |
| R1 | −3.5980E−01 | 1.3483E−03 | −3.8730E−04 | 6.1212E−05 | −4.1241E−06 |
| R2 | −6.2643E+01 | 3.8535E−03 | −8.7646E−04 | 1.1168E−04 | −6.0986E−06 |
| R3 | 8.3014E+01 | 2.6098E−02 | −8.0628E−03 | 1.3907E−03 | −1.0181E−04 |
| R4 | −1.1642E+01 | 5.5930E−02 | −2.1207E−02 | 4.2422E−03 | −3.3272E−04 |
| R5 | 8.1421E+01 | 1.2209E−01 | 8.5309E−03 | −3.4251E−02 | 1.0228E−02 |
| R6 | 8.8784E−02 | 1.8966E−01 | −8.3696E−02 | 1.5207E−02 | 0.0000E+00 |
| R7 | −2.9418E+01 | 2.1352E+00 | −1.3783E+00 | 4.7888E−01 | −6.9249E−02 |
| R8 | −5.6453E+01 | −5.1014E+00 | 2.7827E+00 | −8.7581E−01 | 1.2076E−01 |
| R9 | 4.1832E+00 | −1.5388E−01 | 1.3708E−01 | −5.3841E−02 | 8.0912E−03 |
| R10 | −9.0470E−01 | −2.9736E−01 | 8.9355E−02 | −1.6316E−02 | 1.3716E−03 |
| R11 | −1.2313E+00 | −4.1981E−01 | 1.1017E−01 | −1.6292E−02 | 1.0425E−03 |
| R12 | 3.6953E+01 | −1.5881E−02 | 4.3591E−03 | −6.1062E−04 | 3.5152E−05 |

Tables 15 and 16 show design data of inflexion points and arrest points of respective lenses in the camera optical lens 40 according to the fourth embodiment of the present application.

TABLE 15

| | Number of inflexion points | Inflexion point position 1 | Inflexion point position 2 |
|---|---|---|---|
| P1R1 | 1 | 1.885 | — |
| P1R2 | 2 | 0.835 | 1.515 |
| P2R1 | 0 | — | — |
| P2R2 | 0 | — | — |
| P3R1 | 2 | 0.295 | 0.715 |
| P3R2 | 2 | 0.725 | 1.225 |
| P4R1 | 2 | 0.235 | 1.045 |
| P4R2 | 2 | 0.395 | 0.985 |
| P5R1 | 0 | — | — |
| P5R2 | 1 | 1.565 | — |
| P6R1 | 1 | 1.385 | — |
| P6R2 | 0 | — | — |

TABLE 16

| | Number of arrest points | Arrest point position 1 | Arrest point position 2 |
|---|---|---|---|
| P1R1 | 0 | — | — |
| P1R2 | 0 | — | — |
| P2R1 | 0 | — | — |
| P2R2 | 0 | — | — |
| P3R1 | 2 | 0.565 | 0.805 |
| P3R2 | 1 | 0.925 | — |
| P4R1 | 1 | 0.405 | — |
| P4R2 | 2 | 0.755 | 1.115 |
| P5R1 | 0 | — | — |
| P5R2 | 0 | — | — |
| P6R1 | 0 | — | — |
| P6R2 | 0 | — | — |

Figure 14:
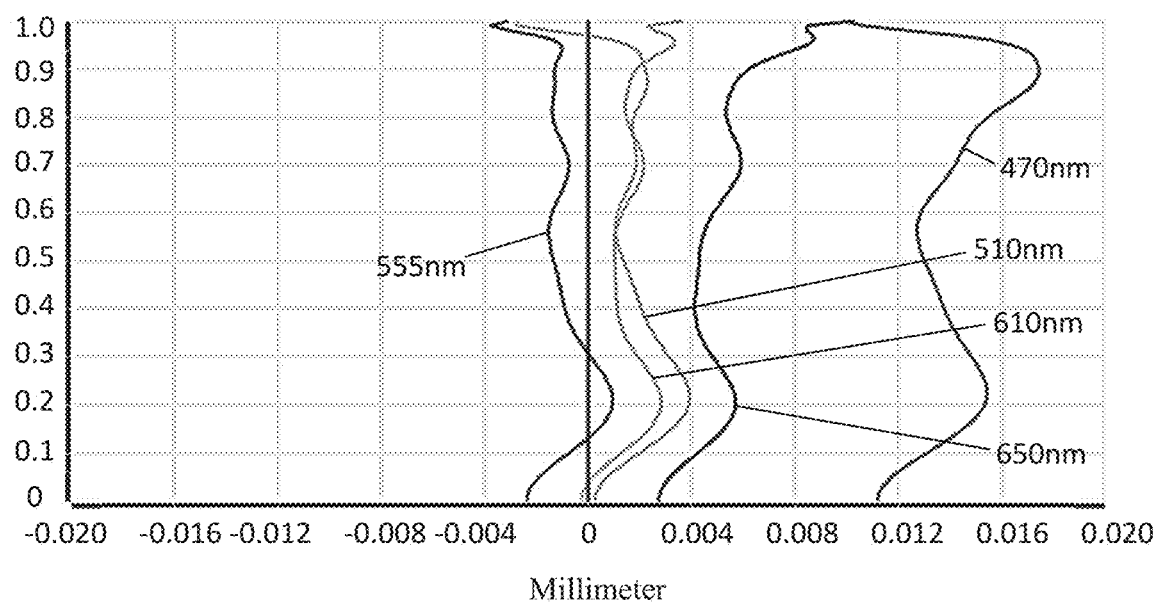
FIG. 14 is a schematic diagram of a longitudinal aberration of the camera optical lens shown in FIG. 13.
Figure 15:
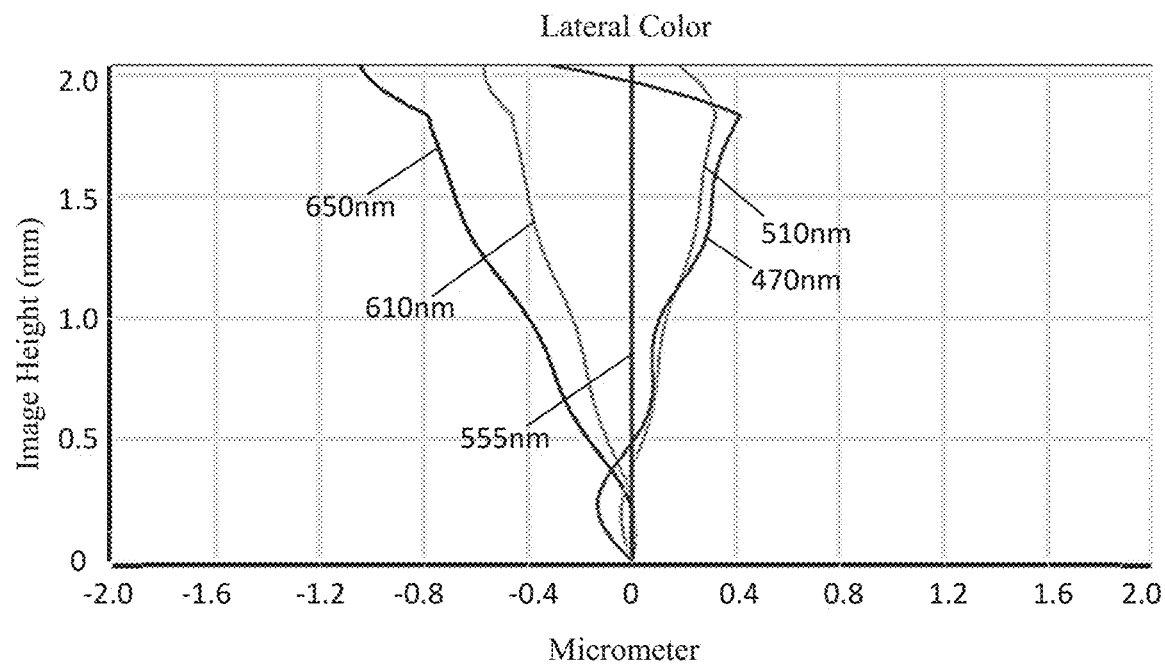
FIG. 15 is a schematic diagram of a lateral color of the camera optical lens shown in FIG. 13.
Figure 16:
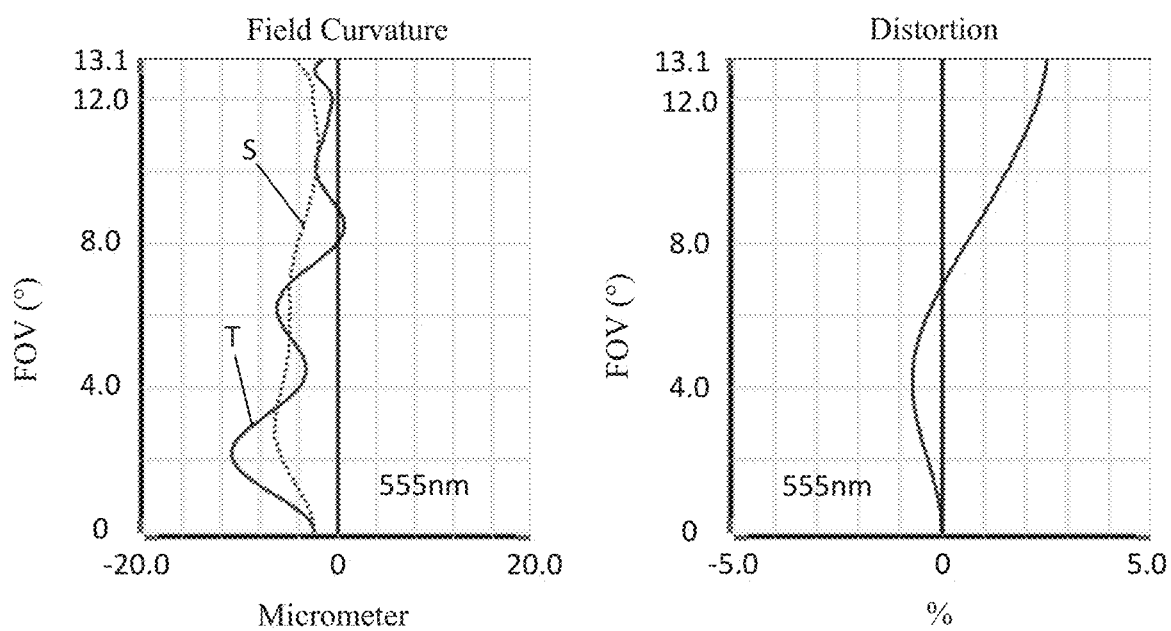
FIG. 16 is schematic diagrams of a field curvature and a distortion of the camera optical lens shown in FIG. 13.
Figure 17:
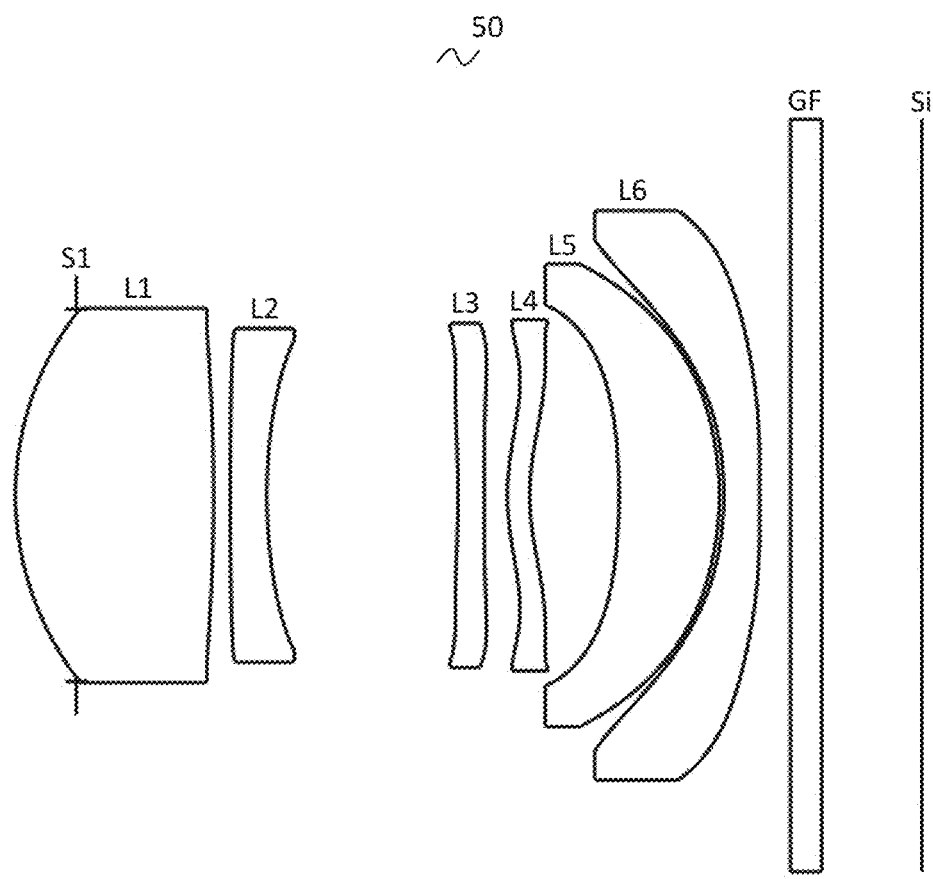
FIG. 17 is a schematic structural diagram of a camera optical lens according to a fifth embodiment of the present application.

FIG. 14 and FIG. 15 respectively show a longitudinal aberration and a lateral color of light with wavelengths of 650 nm, 610 nm, 555 nm, 510 nm and 470 nm after passing through the camera optical lens 40 according to the fourth embodiment. FIG. 16 shows a schematic diagram of a field curvature and a distortion of light with a wavelength of 555 nm after passing through the camera optical lens 40 of the fourth embodiment.

Table 21 below lists values corresponding to respective conditions in this embodiment according to the above conditions. Obviously, the camera optical system of this embodiment satisfies the above conditions.

In this embodiment, the entrance pupil diameter ENPD of the camera optical lens is 3.797 mm, the full field image height IH is 2.040 mm, and the field of view FOV in a diagonal direction is 26.20°. The camera optical lens 40 meets the design requirements for a long focal length, and its on-axis and off-axis aberrations are sufficiently corrected, thereby leading to better optical characteristics.

Fifth Embodiment

The fifth embodiment is basically the same as the first embodiment, and involves symbols having the same meanings as the first embodiment. Only the differences therebetween will be listed below.

In this embodiment, the fourth lens L4 has positive refractive power, and the image side surface of the sixth lens L6 is concave at the paraxial position.

Table 17 and Table 18 show design data of the camera optical lens 50 according to the fifth embodiment of the present application.

TABLE 17

|  | R | d | nd | vd |
|---|---|---|---|---|
| S1 | ∞ | d0 = −0.409 | | |
| R1 | 1.958 | d1 = 1.331 | nd1 1.5444 | v1 55.82 |
| R2 | −12.550 | d2 = 0.112 | | |
| R3 | 31.820 | d3 = 0.245 | nd2 1.6700 | v2 19.39 |
| R4 | 3.528 | d4 = 1.282 | | |
| R5 | −6.863 | d5 = 0.179 | nd3 1.5346 | v3 55.69 |
| R6 | −240.765 | d6 = 0.154 | | |
| R7 | 1.573 | d7 = 0.150 | nd4 1.5346 | v4 55.69 |
| R8 | 1.556 | d8 = 0.599 | | |
| R9 | −4.119 | d9 = 0.675 | nd5 1.6700 | v5 19.39 |
| R10 | −1.778 | d10 = 0.030 | | |
| R11 | −2.014 | d11 = 0.239 | nd6 1.5346 | v6 55.69 |
| R12 | 50.381 | d12 = 0.207 | | |
| R13 | ∞ | d13 = 0.210 | ndg 1.5168 | vg 64.17 |
| R14 | ∞ | d14 = 0.673 | | |

Table 18 shows the aspheric surface data of respective lenses in the camera optical lens 50 according to the fifth embodiment of the present application.

TABLE 18

|  | Conic coefficient | Aspheric coefficient | | | | |
|---|---|---|---|---|---|---|
|  | k | A4 | A6 | A8 | A10 | A12 |
| R1 | −3.4047E−01 | 6.7788E−03 | −1.2277E−02 | 1.9430E−02 | −1.7335E−02 | 9.6596E−03 |
| R2 | 2.2386E+01 | −4.9036E−06 | −1.4715E−03 | 6.9330E−03 | −1.8553E−03 | −1.7392E−03 |
| R3 | 9.9000E+01 | −1.6963E−02 | 2.8429E−02 | −4.4589E−02 | 7.4274E−02 | −7.4216E−02 |
| R4 | −2.7501E+00 | −2.8717E−02 | 3.1259E−01 | −1.0347E+00 | 2.0333E+00 | −2.3937E+00 |
| R5 | 3.1584E+01 | 1.5336E−01 | −2.9894E−01 | 9.6986E−01 | −2.2724E+00 | 3.3656E+00 |
| R6 | 9.9000E+01 | 4.6536E−02 | 7.8393E−02 | −4.3529E−01 | 9.3739E−01 | −1.2511E+00 |
| R7 | −4.5980E+00 | −2.0177E−01 | −2.5955E−01 | 1.2996E+00 | −3.4368E+00 | 5.7510E+00 |
| R8 | −1.4974E+01 | 2.1047E−01 | −1.5017E+00 | 4.0811E+00 | −7.3223E+00 | 8.8409E+00 |
| R9 | 9.0544E+00 | 1.0630E−03 | −1.7418E−01 | 3.1721E−01 | −3.9379E−01 | 3.5700E−01 |
| R10 | −3.2654E−01 | 2.3934E−01 | −7.2584E−01 | 1.0593E+00 | −9.1720E−01 | 4.7623E−01 |
| R11 | −4.6853E−01 | 7.8566E−02 | −5.4007E−01 | 1.0308E+00 | −1.0526E+00 | 6.3825E−01 |
| R12 | 6.6019E+02 | −2.5348E−01 | 3.5680E−01 | −3.3596E−01 | 2.0625E−01 | −7.8728E−02 |

|  | Conic coefficient | Aspheric coefficient | | | | |
|---|---|---|---|---|---|---|
|  | k | A14 | A16 | A18 | A20 | |
| R1 | −3.4047E−01 | −3.4322E−03 | 7.3023E−04 | −6.8651E−05 | 8.0638E−07 | |
| R2 | 2.2386E+01 | 1.0114E−03 | −1.1826E−04 | 4.1545E−04 | −6.3940E−05 | |
| R3 | 9.9000E+01 | 4.6822E−02 | −1.6051E−02 | 2.1916E−03 | 3.4129E−04 | |
| R4 | −2.7501E+00 | 1.7315E+00 | −7.5689E−01 | 1.8692E−01 | −1.9526E−02 | |
| R5 | 3.1584E+01 | −3.1765E+00 | 1.8338E+00 | −5.8819E−01 | 8.0125E−02 | |
| R6 | 9.9000E+01 | 9.7721E−01 | −4.3637E−01 | 1.0194E−01 | −9.3813E−03 | |
| R7 | −4.5980E+00 | −6.1423E+00 | 4.0582E+00 | −1.4935E+00 | 2.3231E−01 | |
| R8 | −1.4974E+01 | −7.0110E+00 | 3.4950E+00 | −9.8682E−01 | 1.1982E−01 | |
| R9 | 9.0544E+00 | −2.4183E−01 | 1.1545E−01 | −3.4707E−02 | 4.7059E−03 | |
| R10 | −3.2654E−01 | −1.4701E−01 | 2.6896E−02 | −3.2751E−03 | 2.9066E−04 | |
| R11 | −4.6853E−01 | −2.3550E−01 | 5.1816E−02 | −6.2302E−03 | 3.1364E−04 | |
| R12 | 6.6019E+02 | 1.6318E−02 | −1.0060E−03 | −2.1025E−04 | 3.0035E−05 | |

Table 19 and Table 20 show design data of inflexion points and arrest points of respective lenses in the camera optical lens 50 according to the fifth embodiment of the present application.

TABLE 19

| | Number of inflexion points | Inflexion point position 1 | Inflexion point position 2 |
|---|---|---|---|
| P1R1 | 0 | — | — |
| P1R2 | 1 | 0.915 | — |
| P2R1 | 0 | — | — |
| P2R2 | 0 | — | — |
| P3R1 | 2 | 0.375 | 0.755 |
| P3R2 | 2 | 0.085 | 0.715 |
| P4R1 | 2 | 0.415 | 1.015 |
| P4R2 | 2 | 0.445 | 0.965 |
| P5R1 | 0 | — | — |
| P5R2 | 0 | — | — |
| P6R1 | 1 | 1.415 | — |
| P6R2 | 2 | 0.085 | 1.885 |

TABLE 20

| | Number of arrest points | Arrest point position 1 | Arrest point position 2 |
|---|---|---|---|
| P1R1 | 0 | — | — |
| P1R2 | 0 | — | — |
| P2R1 | 0 | — | — |
| P2R2 | 0 | — | — |
| P3R1 | 0 | — | — |
| P3R2 | 2 | 0.145 | 0.875 |
| P4R1 | 1 | 0.755 | — |
| P4R2 | 2 | 0.905 | 1.015 |
| P5R1 | 0 | — | — |
| P5R2 | 0 | — | — |
| P6R1 | 0 | — | — |
| P6R2 | 1 | 0.145 | — |

Figure 18:
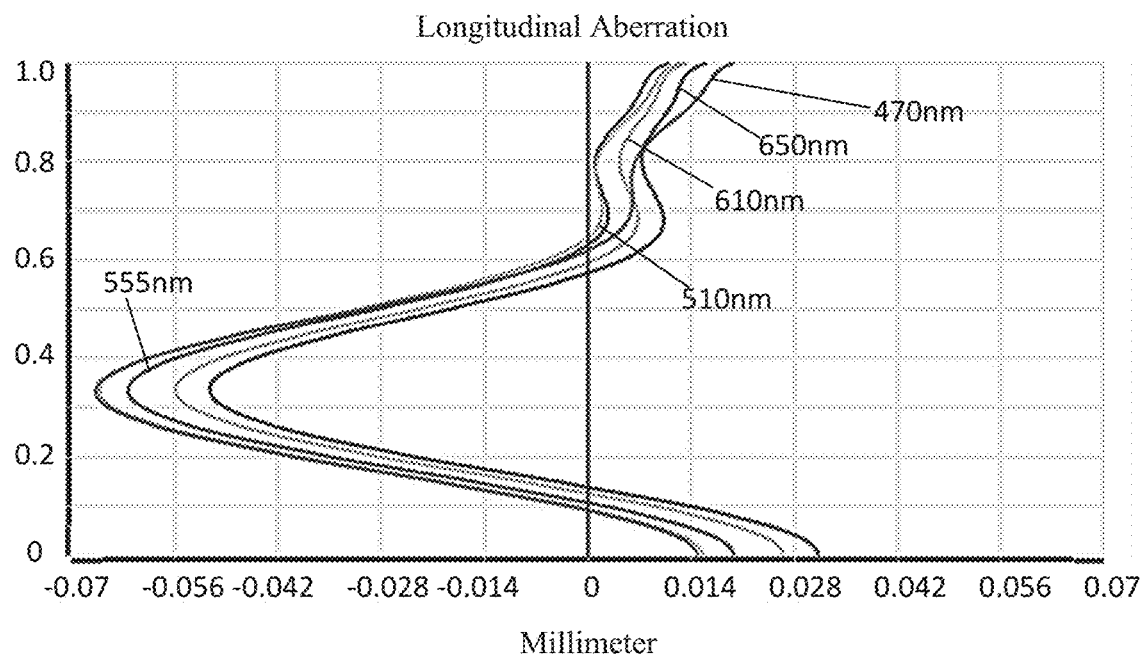
FIG. 18 is a schematic diagram of a longitudinal aberration of the camera optical lens shown in FIG. 17.
Figure 19:
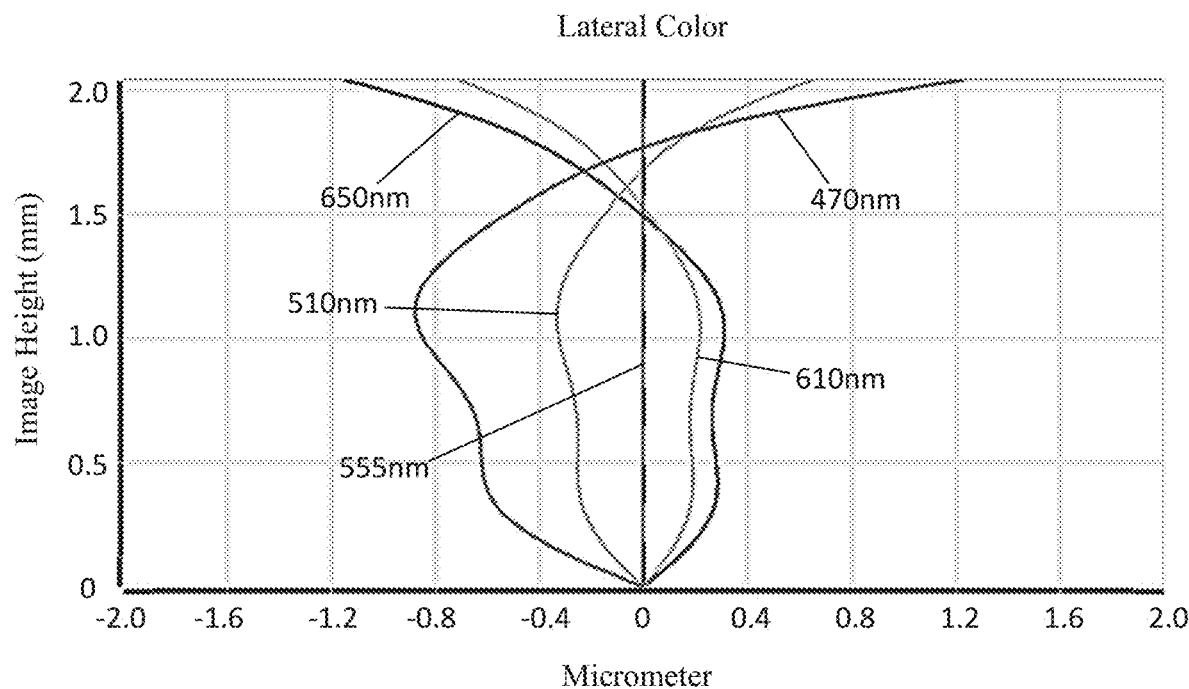
FIG. 19 is a schematic diagram of a lateral color of the camera optical lens shown in FIG. 17.
Figure 20:
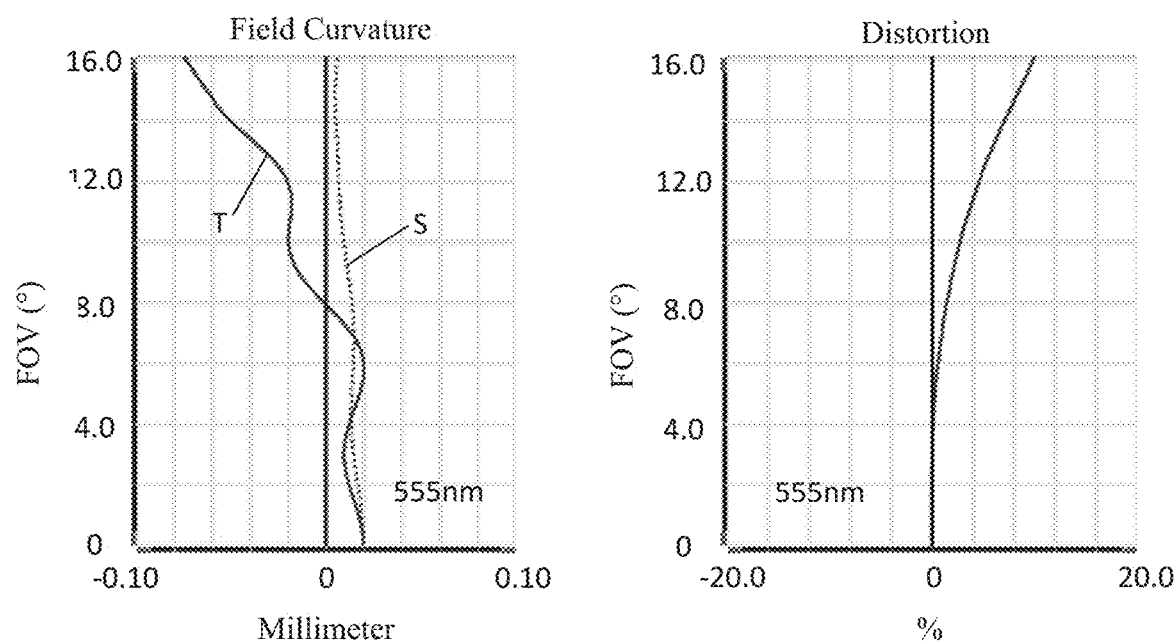
FIG. 20 is schematic diagrams of a field curvature and a distortion of the camera optical lens shown in FIG. 17.

FIG. 18 and FIG. 19 respectively show the longitudinal aberration and lateral color of light with wavelengths of 650 nm, 610 nm, 555 nm, 510 nm and 470 nm after passing through the camera optical lens 50 according to the fifth embodiment. FIG. 20 shows a schematic diagram of a field curvature and a distortion of light with a wavelength of 555 nm after passing through the camera optical lens 50 of the fifth embodiment.

The Table 21 below lists values corresponding to respective condition in this embodiment according to the above conditions. Obviously, the camera optical system of this embodiment satisfies the above conditions.

In this embodiment, the entrance pupil diameter ENPD of the camera optical lens is 2.474 mm, the full field image height IH is 2.040 mm, and the field of view FOV in a diagonal direction is 32.00°. The camera optical lens 50 meets the design requirements for a long focal length, and its on-axis and off-axis aberrations are sufficiently corrected, thereby leading to better optical characteristics.

TABLE 21

| Parameter and conditional expression | Embodiment 1 | Embodiment 2 | Embodiment 3 | Embodiment 4 | Embodiment 5 |
|---|---|---|---|---|---|
| f2/f | −0.60 | −0.98 | −0.63 | −0.72 | −0.92 |
| R6/R5 | 1471.28 | 1.52 | 99.94 | 10.50 | 35.08 |
| d4/d5 | 5.46 | 2.02 | 7.33 | 9.20 | 7.16 |
| f | 8.643 | 6.662 | 8.863 | 8.410 | 6.432 |
| f1 | 3.436 | 3.479 | 3.504 | 3.457 | 3.205 |
| f2 | −5.220 | −6.529 | −5.596 | −6.031 | −5.889 |
| f3 | −26.968 | −666.216 | −20.347 | −24.828 | −13.176 |
| f4 | −11.035 | −16.100 | −11.902 | −8.475 | 128.206 |
| f5 | 4.120 | 4.957 | 11.740 | 4.158 | 4.146 |
| f6 | −4.470 | −4.212 | −15.536 | −4.685 | −3.605 |
| f12 | 6.069 | 5.557 | 5.864 | 5.677 | 5.058 |
| FNO | 2.22 | 2.22 | 2.22 | 2.22 | 2.60 |
| TTL | 7.437 | 6.634 | 7.798 | 7.258 | 6.086 |
| IH | 2.040 | 2.040 | 2.040 | 2.040 | 2.040 |
| FOV | 26.80° | 32.00° | 25.40° | 26.20° | 32.00° |

Those of ordinary skill in the art can understand that the above-mentioned embodiments are specific embodiments for realizing the present application, and in practical applications, various changes can be made in form and detail without departing from the spirit and scope of the present application.

What is claimed is:

1. A camera optical lens, comprising from an object side to an image side:
    a first lens having positive refractive power;
    a second lens having negative refractive power;
    a third lens having negative refractive power;
    a fourth lens;
    a fifth lens having positive refractive power; and
    a sixth lens having negative refractive power,
    wherein the camera optical lens satisfies:

$-1.00 \leq f2/f \leq -0.60$;

$1.50 \leq R6/R5$;

$2.00 \leq d4/d5 \leq 10.00$; and $f3/f \leq -2.00$, where f denotes a focal length of the camera optical lens,
    f2 denotes a focal length of the second lens,
    R5 denotes a central curvature radius of an object side surface of the third lens,
    R6 denotes a central curvature radius of an image side surface of the third lens,
    d4 denotes an on-axis distance from an image side surface of the second lens to the object side surface of the third lens,
    d5 denotes an on-axis thickness of the third lens, and
    where f3 denotes a focal length of the third lens.

2. The camera optical lens as described in claim 1, further satisfying:

$2.50 \leq (R9+R10)/(R9-R10) \leq 20.00$, where
    R9 denotes a central curvature radius of an object side surface of the fifth lens, and
    R10 denotes a central curvature radius of an image side surface of the fifth lens.

3. The camera optical lens as described in claim 1, further satisfying:

$0.20 \leq f1/f \leq 0.78$;

$-1.46 \leq (R1+R2)/(R1-R2) \leq -0.40$; and $0.10 \leq d1/TTL \leq 0.33$, where f1 denotes a focal length of the first lens, R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

4. The camera optical lens as described in claim 1, further satisfying:

$$0.624 \le (R3+R4)/(R3-R4) \le 2.24; \text{ and}$$

$$0.02 \le d3/TTL \le 0.06,$$

where

R3 denotes a central curvature radius of an object side surface of the second lens, R4 denotes a central curvature radius of the image side surface of the second lens, d3 denotes an on-axis thickness of the second lens, and TTL denotes a total optical length from an object side surface of the first lens to an image plane of the camera optical lens along an optic axis.

5. The camera optical lens as described in claim 1, further satisfying:

$$-9.69 \le (R5+R6)/(R5-R6) \le -0.67; \text{ and}$$

$$0.01 \le d5/TTL \le 0.12,$$

where TTL denotes a total optical length from an object side surface of the first lens to an image plane of the camera optical lens along an optic axis.

6. The camera optical lens as described in claim 1, further satisfying:

$$-4.83 \le f4/f \le 29.90;$$

$$1.20 \le (R7+R8)/(R7-R8) \le 276.09; \text{ and}$$

$$0.01 \le d7/TTL \le 0.07,$$

where f4 denotes a focal length of the fourth lens,

R7 denotes a central curvature radius of an object side surface of the fourth lens, R8 denotes a central curvature radius of an image side surface of the fourth lens, and TTL denotes a total optical length from an object side surface of the first lens to an image plane of the camera optical lens along an optic axis.

7. The camera optical lens as described in claim 1, further satisfying:

$$0.24 \le f5/f \le 1.99; \text{ and}$$

$$0.04 \le d9/TTL \le 0.23,$$

where f5 denotes a focal length of the fifth lens, d9 denotes an on-axis thickness of the fifth lens, and TTL denotes a total optical length from an object side surface of the first lens to an image plane of the camera optical lens along an optic axis.

8. The camera optical lens as described in claim 1, further satisfying:

$$-3.51 \le f6/f \le -0.34;$$

$$-2.94 \le (R11+R12)/(R11-R12) \le -0.60; \text{ and}$$

$$0.02 \le d11/TTL \le 0.16,$$

where f6 denotes a focal length of the sixth lens,

R11 denotes a central curvature radius of an object side surface of the sixth lens, R12 denotes a central curvature radius of an image side surface of the sixth lens, d11 denotes an on-axis thickness of the sixth lens, and TTL denotes a total optical length from an object side surface of the first lens to an image plane of the camera optical lens along an optic axis.

9. The camera optical lens as described in claim 1, further satisfying:

$$f/TTL \ge 1.00,$$

where TTL denotes a total optical length from an object side surface of the first lens to an image plane of the camera optical lens along an optic axis.

* * * * *